United States Patent
Loganathan et al.

(10) Patent No.: US 11,210,670 B2
(45) Date of Patent: Dec. 28, 2021

(54) AUTHENTICATION AND SECURITY FOR MOBILE-DEVICE TRANSACTIONS

(71) Applicant: Early Warning Services, LLC, Scottsdale, AZ (US)

(72) Inventors: Ravi Loganathan, Charlotte, NC (US); Ronald Scott Alcorn, Austin, TX (US); Michael J. Huffman, San Mateo, CA (US); Gregory D. Slowiak, Chicago, IL (US); Angela M. Montoya, Scottsdale, AZ (US)

(73) Assignee: EARLY WARNING SERVICES, LLC, Scottsdale, AZ (US)

( * ) Notice: Subject to any disclaimer, the term of this patent is extended or adjusted under 35 U.S.C. 154(b) by 562 days.

(21) Appl. No.: 15/908,767

(22) Filed: Feb. 28, 2018

(65) Prior Publication Data
US 2018/0247312 A1    Aug. 30, 2018

Related U.S. Application Data

(60) Provisional application No. 62/464,956, filed on Feb. 28, 2017.

(51) Int. Cl.
*G06Q 20/40* (2012.01)
*G06Q 30/02* (2012.01)
(Continued)

(52) U.S. Cl.
CPC ......... *G06Q 20/4016* (2013.01); *G06Q 20/32* (2013.01); *G06Q 20/322* (2013.01);
(Continued)

(58) Field of Classification Search
CPC .... G06Q 20/00–425; H04L 63/00–308; H04L 2463/00–146; H04W 12/00–80
See application file for complete search history.

(56) References Cited

U.S. PATENT DOCUMENTS

| | | | |
|---|---|---|---|
| 5,794,207 A * | 8/1998 | Walker | G06Q 20/00 705/77 |
| 5,892,900 A * | 4/1999 | Ginter | G06F 21/10 726/26 |

(Continued)

OTHER PUBLICATIONS

NoPass, "No Password Login | Touch ID Fingerprint iPhone App," available at https://web.archive.org/web/20150328095715/http://www.nopassapp.com/, Mar. 28, 2015.

(Continued)

*Primary Examiner* — John W Hayes
*Assistant Examiner* — Chenyuh Kuo
(74) *Attorney, Agent, or Firm* — Bryan Cave Leighton Paisner LLP

(57) ABSTRACT

A method including collecting transactional information from a mobile application on the mobile device. The mobile device can be used by a user to initiate an activity at a risk moment. The method also can include aggregating a set of risk signals. The method additionally can include obtaining a first set of risk rules for a model specific to the activity requested by the user. Each risk rule of the first set of risk rules can define weights when the risk rule is triggered based on one or more risk signals of the set of risk signals. The method further can include executing a risk engine using the first set of risk rules for the model and using the set of risk signals to generate a risk score. The risk score can be based on the weights of triggered risk rules of the first set of risk rules. The method additionally can include generating a disposition based on a comparison of the risk score to one or more predefined thresholds scores for the model. Other embodiments of related systems and methods are disclosed.

20 Claims, 7 Drawing Sheets

(51) Int. Cl.
  *G06Q 20/32* (2012.01)
  *G06Q 20/34* (2012.01)
  *G06Q 20/38* (2012.01)
  *H04L 29/06* (2006.01)
  *H04L 9/32* (2006.01)
  *G06Q 40/00* (2012.01)
  *H04W 12/06* (2021.01)

(52) U.S. Cl.
  CPC ..... *G06Q 20/4014* (2013.01); *H04L 63/0876* (2013.01); *H04W 12/06* (2013.01); *H04L 2463/082* (2013.01)

(56) References Cited

U.S. PATENT DOCUMENTS

| | | | |
|---|---|---|---|
| 6,783,065 B2* | 8/2004 | Spitz | G06Q 20/10 235/376 |
| 6,891,953 B1 | 5/2005 | DeMello et al. | |
| 7,103,261 B2 | 9/2006 | Grecia | |
| 7,254,235 B2 | 8/2007 | Boudreault et al. | |
| 7,343,014 B2 | 3/2008 | Sovio et al. | |
| 7,526,650 B1 | 4/2009 | Wimmer | |
| 7,636,668 B1 | 12/2009 | Alves et al. | |
| 7,769,998 B2 | 8/2010 | Lynch et al. | |
| 8,001,612 B1 | 8/2011 | Wieder | |
| 8,402,555 B2 | 3/2013 | Grecia | |
| 8,533,860 B1 | 9/2013 | Grecia | |
| 8,887,308 B2 | 11/2014 | Grecia | |
| D769,296 S | 10/2016 | Grecia | |
| 9,928,490 B1 | 3/2018 | Vancini et al. | |
| D826,955 S | 8/2018 | Grecia | |
| 10,187,366 B2* | 1/2019 | Louis | H04L 63/08 |
| 10,318,936 B2 | 6/2019 | Muthu et al. | |
| D857,054 S | 8/2019 | Grecia | |
| D857,712 S | 8/2019 | Grecia | |
| 10,395,247 B2 | 8/2019 | Gilliam, III et al. | |
| 10,405,182 B2* | 9/2019 | Lu | G06F 21/606 |
| 10,832,248 B1* | 11/2020 | Kramme | G06Q 30/0185 |
| 2002/0046185 A1 | 4/2002 | Villart et al. | |
| 2003/0165328 A1 | 9/2003 | Grecia | |
| 2003/0216996 A1 | 11/2003 | Cummings et al. | |
| 2004/0030645 A1 | 2/2004 | Monaghan | |
| 2004/0138955 A1 | 7/2004 | Song et al. | |
| 2005/0065891 A1 | 3/2005 | Lee et al. | |
| 2005/0144452 A1 | 6/2005 | Lynch et al. | |
| 2005/0203959 A1 | 9/2005 | Muller et al. | |
| 2005/0289030 A1 | 12/2005 | Smith | |
| 2006/0212401 A1 | 9/2006 | Ameerally et al. | |
| 2007/0156726 A1 | 7/2007 | Levy | |
| 2008/0010685 A1 | 1/2008 | Holtzman et al. | |
| 2008/0091606 A1 | 4/2008 | Grecia | |
| 2008/0222199 A1 | 9/2008 | Tiu et al. | |
| 2008/0313264 A1 | 12/2008 | Pestoni | |
| 2008/0313714 A1 | 12/2008 | Fetterman et al. | |
| 2009/0018909 A1 | 1/2009 | Grecia | |
| 2009/0083541 A1 | 3/2009 | Levine | |
| 2009/0119207 A1 | 5/2009 | Grecia | |
| 2010/0010906 A1 | 1/2010 | Grecia | |
| 2010/0100899 A1 | 4/2010 | Bradbury et al. | |
| 2010/0185868 A1 | 7/2010 | Grecia | |
| 2011/0099382 A1 | 4/2011 | Grecia | |
| 2011/0288946 A1 | 11/2011 | Baiya et al. | |
| 2012/0151220 A1 | 6/2012 | Grecia | |
| 2013/0024375 A1* | 1/2013 | Choudhuri | G06Q 20/4016 705/44 |
| 2013/0036048 A1 | 2/2013 | Campos et al. | |
| 2013/0080333 A1 | 3/2013 | Kamotskyy et al. | |
| 2013/0110678 A1 | 5/2013 | Vigier et al. | |
| 2013/0179281 A1 | 7/2013 | White et al. | |
| 2013/0179352 A1 | 7/2013 | Dwyre et al. | |
| 2013/0185214 A1 | 7/2013 | Azen et al. | |
| 2014/0032691 A1* | 1/2014 | Barton | G06F 21/604 709/206 |
| 2014/0195425 A1 | 7/2014 | Campos et al. | |
| 2014/0304778 A1 | 10/2014 | Grecia | |
| 2015/0026057 A1* | 1/2015 | Calman et al. | G06Q 40/02 705/42 |
| 2015/0235207 A1* | 8/2015 | Murphy, Jr. | G06Q 20/382 705/44 |
| 2017/0193514 A1* | 7/2017 | Chen | G06Q 20/4016 |
| 2019/0012647 A1 | 1/2019 | Bouey et al. | |
| 2020/0118089 A1 | 4/2020 | Bartrim et al. | |
| 2020/0118090 A1 | 4/2020 | Bartrim et al. | |
| 2020/0118091 A1 | 4/2020 | Bartrim et al. | |

OTHER PUBLICATIONS

Constant Contact Tech Blog, "iOS Security: How Apple Protects Data on iOS Devices—Part 1," available at https://web.archive.org/web/20150403175348/https://techblog.constantcontact.com/software-development/ios-security/, Dec. 8, 2014.

NoPass, "Register," available at https://web.archive.org/web/20141222172212/http://www.nopassapp.com/register/, Dec. 22, 2014.

NoPass, "Login," available at https://web.archive.org/web/20141222170523/http://www.nopassapp.com/login/, Dec. 22, 2014.

Apple, "iOS Security," available at https://web.archive.org/web/20140226213513/http://images.apple.com/iphone/business/docs/iOS_Security_Feb14.pdf, Feb. 2014.

EBay Developers Program, "eBay Web Services XML API Guide," 2005.

Provident Bank, Universal Payment Identification Code (UPIC) guide (Year: 2016).

* cited by examiner

AUTHENTICATION AND SECURITY FOR MOBILE-DEVICE TRANSACTIONS

CROSS-REFERENCE TO RELATED APPLICATIONS

This application claims the benefit of U.S. Provisional Application No. 62/464,956, filed Feb. 28, 2017. U.S. Provisional Application No. 62/464,956 is incorporated herein by reference in its entirety.

TECHNICAL FIELD

This disclosure relates generally to providing security in processing of transactions, and relates more particularly to providing authentication and security in transactions initiated through a mobile device.

BACKGROUND

Various types of transaction systems allow users to initiate activities, such as creating user accounts, provisioning accounts, initiating transactions, etc., using a mobile device. When an activity is requested from a mobile device, the user is generally "faceless" to the transaction system, as the activity is initiated through a remote mobile device without an opportunity to verify the identity of the user in person. Fraudsters often seek to capitalize on such faceless opportunities by initiating activities under false pretenses, such as by using stolen identities and/or stolen accounts.

BRIEF DESCRIPTION OF THE DRAWINGS

To facilitate further description of the embodiments, the following drawings are provided in which.

Figure 1:
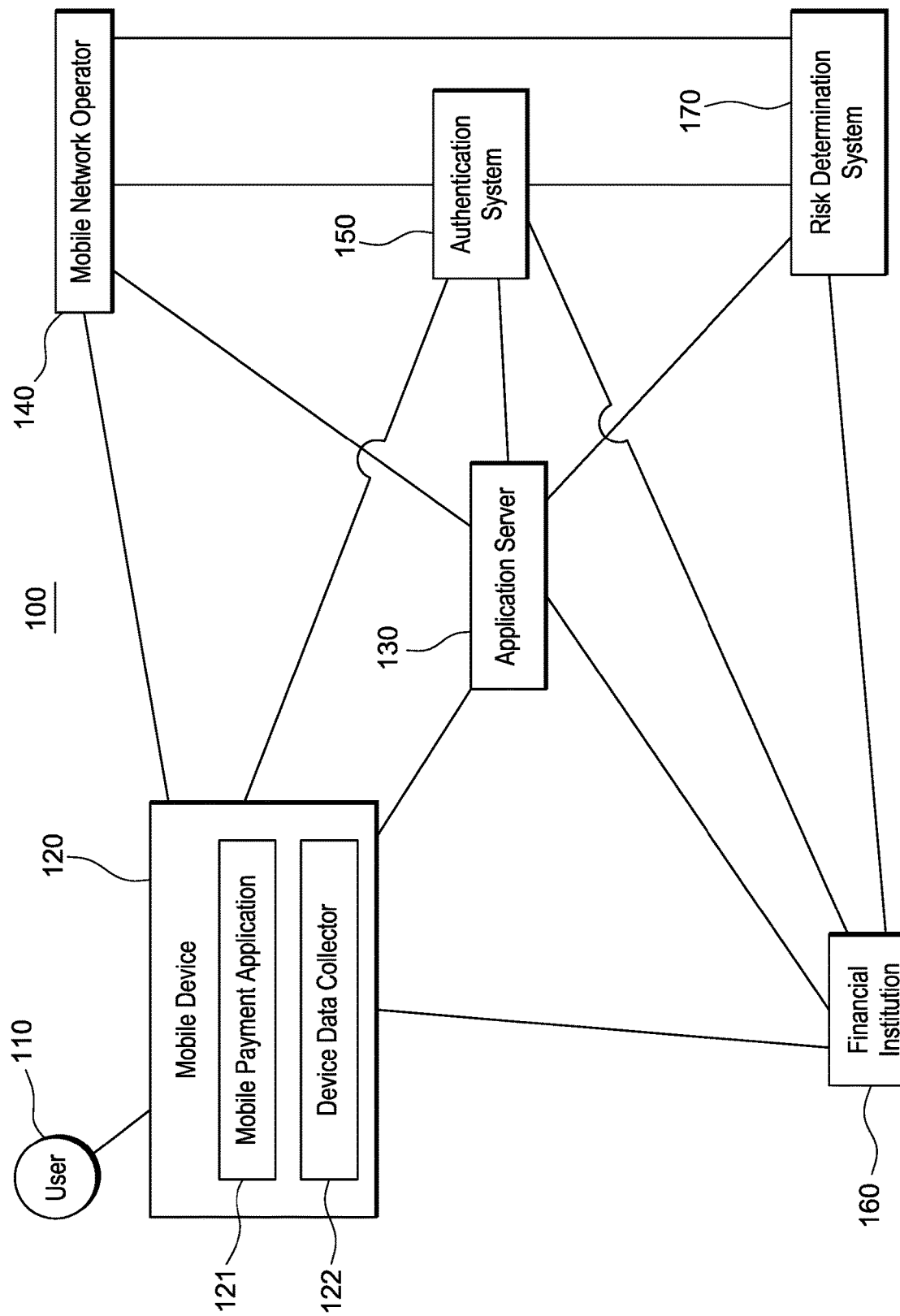
FIG. 1 illustrates a block diagram of a system that can be employed for performing authentication and security for the mobile-device transactions, according to an embodiment.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately ten milliseconds, fifty milliseconds, one hundred milliseconds, five hundred milliseconds, one second, five seconds, ten seconds, or thirty seconds.

DESCRIPTION OF EXAMPLES OF EMBODIMENTS

Turning to the drawings, FIG. 1 illustrates a block diagram of a system 100 that can be employed for performing authentication and security for the mobile-device transactions. System 100 is merely exemplary, and embodiments of the system are not limited to the embodiments presented herein. The system can be employed in many different embodiments or examples not specifically depicted or described herein. In some embodiments, certain elements or modules of system 100 can perform various procedures, processes, and/or activities. In other embodiments, the procedures, processes, and/or activities can be performed by other suitable elements or modules of system 100.

Figure 4:
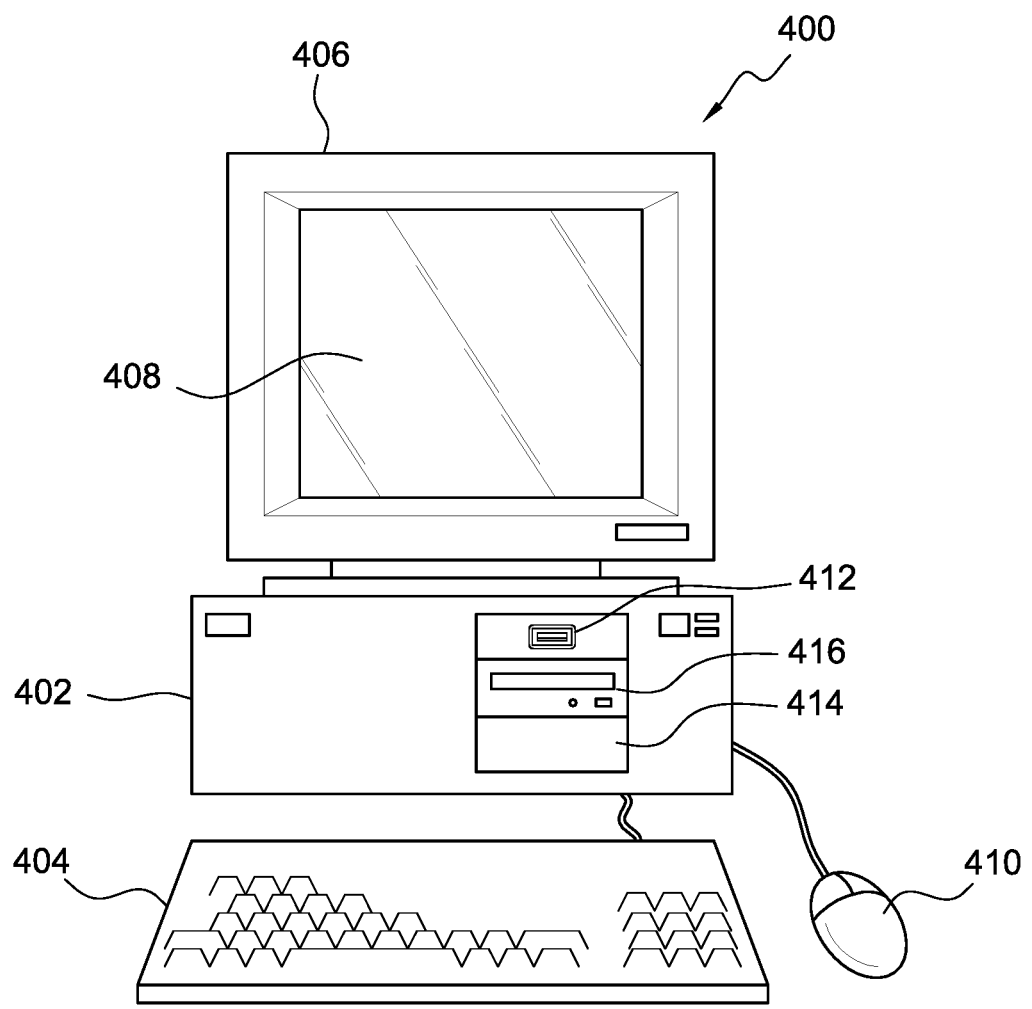
FIG. 4 illustrates a computer that is suitable for implementing an embodiment of components of the system of FIG. 1.

In some embodiments, system 100 can include one or more mobile devices, such as mobile device 120; an application server 130; one or more mobile network operators, such as mobile network operator 140; an authentication system 150; one or more financial institutions, such as financial institution 160; and/or a risk determination system 170. In a number of embodiments, each of the mobile devices (e.g., 120), application server 130, mobile network operators (e.g., 140), authentication system 150, financial institutions (e.g., 160), and/or risk determination system 170 can include a computer system, such as computer system 400, as shown in FIG. 4 and described below, and can be a single computer, a single server, or a cluster or collection of computers or servers, or a cloud of computers or servers. In many embodiments, various components (e.g., 120, 130, 140, 150, 160, 170) of system 100 can be in data communication with various other components (e.g., 120, 130, 140, 150, 160, 170) of system 100, such as through one or more networks. The networks can be the Internet and/or other suitable data communication networks.

In a number of embodiments, mobile device 120 can include various software applications, modules, and/or systems, such as a mobile payment application 121 and/or a device data collector 122. In many embodiments, mobile payment application 121 and/or device data collector 122 can communicate with application applicator service 130. In some embodiments mobile payment application 121 can include device data collector 122. In other embodiments, device data collector 122 can be separate from mobile payment application 121. In many embodiments, mobile device 120 can be used by a user 110 to install and/or use mobile payment application 121. In several embodiments, mobile payment application 121 can be used to send and/or receive funds, such as with another user (e.g., 110) operating another mobile device (e.g., 120). In many embodiments, user 110 can interact with mobile payment application 121 to create a login and/or password for using mobile payment application 121 or one or more of the services included therein, login to a previously created account, provision a financial account, set up and/or change a user profile, send and/or receive funds, and/or perform other suitable activities. In many embodiments, mobile payment application 121 can be a person-to-person (P2P) payment application, which can facilitate funds transfers between individual users (e.g., 110) of mobile devices (e.g., 120).

In some embodiments, mobile payment application 121 can be a mobile application that can be installed by user 110 on mobile device 120. In other embodiments, mobile payment application 121 can be a web-based interface accessed through a web browser on mobile device 120. In still other embodiments, mobile payment application 121 can be a plug-in or other suitable interface that is accessed through another application, such as a mobile wallet. The mobile wallet can be provided by mobile wallet providers, such as financial institutions (e.g., Chase Pay., Wells Fargo Wallet), merchant associations (e.g., Merchant Customer Exchange (MCX) CurrentC), and mobile device hardware and/or software manufacturers (e.g., Google Wallet, Android Pay, Apple Pay, Samsung Pay). In some embodiments, mobile payment application 121 can be a mobile wallet.

In several embodiments, to setup mobile payment application 121, user 110 of mobile device 120 can add one or more underlying financial accounts, such as checking accounts, savings accounts, credit card accounts, or debit card accounts, to mobile payment application 121 by uploading account information (e.g., card number, account number, etc.) for the one or more financial accounts through mobile payment application 121 to application server 130. The process of uploading an underlying financial account to application server 130 to allow for future transactions in which mobile payment application 121 uses the underlying financial account is referred to as "provisioning." After the financial account has been provisioned to mobile payment application 121, mobile payment application 121 can be used to perform financial transactions, such as sending funds from the underlying financial account and/or receiving funds to the underlying financial account. In some embodiments, after provisioning the underlying financial account, tokenized information can be used for transactions, so that the underlying account information is not transferred between transacting parties.

In various embodiments, mobile network operator 140 can provide mobile network services (e.g., wireless data communication) for mobile device 120. Mobile network operators (e.g., 140) also are referred to as wireless service providers, wireless carriers, cellular carriers, etc. Examples of mobile network operators (e.g., 140) include Verizon Wireless, AT&T Mobility, T-Mobile, Sprint, etc. Mobile network operators (e.g., 140) can manage mobile network services accounts for mobile devices (e.g., 120), and generally have information about the ownership and status of a mobile device (e.g., 120).

In a number of embodiments, the financial institutions, such as financial institution 160, can be depository financial institutions, such as savings banks, credit unions, savings and loan associations, card issuing financial institutions, or other forms of financial institutions. In many embodiments, financial institution 160 can maintain the underlying financial account, and in some embodiments, can be the card issuer for the underlying financial account. The underlying financial account can be a deposit account, such as a checking account or savings account, or a lending account, such as a charge account or credit account. Financial institution 160 can have information about the ownership of the underlying financial account. In some embodiments, financial institution 160 can be replaced by or supplemented by a card processor, which can have access to information about the underlying financial account.

In many embodiments, when various user actions are performed by user 110 on mobile payment application 121, information about the user actions can be transferred to application server 130. For example, if a first user (e.g., 110) logs in to mobile payment application 121 and initiates a payment to another user (e.g., 110), these actions can be communicated to application server 130. In many embodiments, before performing the action requested by the user, application server 130 can initiate and/or perform various authentication or risk determinations. In many embodiments, application server 130 can collect information about user 110, mobile device 120, mobile network operator 140, financial institution 160, and/or other suitable information from mobile payment application 121, device data collector 122, mobile network operator 140, and/or financial institution 160. In many embodiments, application server 130 can use this collected data to perform the authentication and/or risk determinations. In many embodiments, application server 130 can communicate with authentication system 150 to perform authentication, and/or can communicate with risk determination system 170 to perform risk determination. In some embodiments, application server 130 can communicate with authentication system 150, which can in turn communicate with risk determination system 170 to perform risk determination.

In several embodiments, application server 130, authentication system 150, and/or risk determination system 170 can be in communication with one or more other systems, such as mobile device 120, mobile network operator 140, authentication system 150, and/or financial institution 160. In a number of embodiments, application server 130, authentication system 150, and/or risk determination system 170 can communicate with one or more of these other systems through call-outs and/or by receiving data input. In various embodiments, application server 130, authentication system 150, and/or risk determination system 170 can include a number of systems, which can be implemented in software, hardware, or a combination thereof.

The use of a mobile payment application (e.g., 121) on a mobile device (e.g., 120) to transfer funds can raise several possibilities of fraud. For example, information about user identities and/or financial accounts that have been stolen, such as through data breaches, is readily available to fraudsters on the dark web and other black markets. The fraudsters can then seek to exploit this information by making transactions through mobile payment applications (e.g., 121) using mobile devices (e.g., 120). Transactions occurring through mobile devices (e.g., 120) can be attempted by nameless, faceless fraudsters that seek to impersonate others. For example, user 110 can misrepresent the true and correct identity of the user of mobile device 120 and mobile payment application 121. In some cases, the financial account information can be stolen or otherwise used by user 110 when user 110 does not have legitimate access to the financial account. In the same or other cases, mobile device 120 can be a stolen device, a device bought on the black market, or a device used by someone without authorization.

In many embodiments, application server 130, authentication system 150, and/or risk determination system 170 can beneficially authenticate user 110 and/or determine a risk of fraud using a combination of data sources to ensure that user 110 is authorized to access the financial account and has legitimate access to mobile device 120. In several embodiments, application server 130, authentication system 150, and/or risk determination system 170 can advantageously provide a single source technology solution for mitigating fraud at risk moments. These risk moments can be any risk-related point of interest in the interactions of the user (e.g., 110) with mobile payment application 121 and/or with application server 130. For example, risk moments can include:

creating a new user account in mobile payment application 121, including, for example, generation of credentials (e.g., user name and password) and/or registering a valid token;

provisioning of one or more financial accounts, including, for example adding a new debit card or demand deposit account to the user account;

sending funds, including, for example, executing a funds transfer outbound from a financial account using a user account;

receiving funds, including, for example, receiving funds to a valid financial account;

requesting funds, including, for example, sending a request of funds from a user account to another user account;

changing user account information, including for example, editing email address, phone number, name, or other account-related information; and changing a password, including, for example, resetting a forgotten password or a password change prompted by user error.

In a number of embodiments, application server 130, authentication system 150, and/or risk determination system 170 can empower consumer-facing businesses to defeat dynamic fraud threats by aggregating data from multiple mobile network operators (e.g., 140), multiple financial institutions (e.g., 160), and/or third-party data sources, information from the mobile device (e.g., 120), and/or the performing multifactor authentication and/or digital identity, which collectively can provide a cohesive picture of "ground truth." Real-time data collection, aggregation, and rule development can beneficially empower businesses to fine tune their fraud and risk policies to create new, higher benchmarks for stopping fraud without hurting good customers. The collected data can provide a network view of users that is more complete than is otherwise available in the financial services industry.

Figure 2:
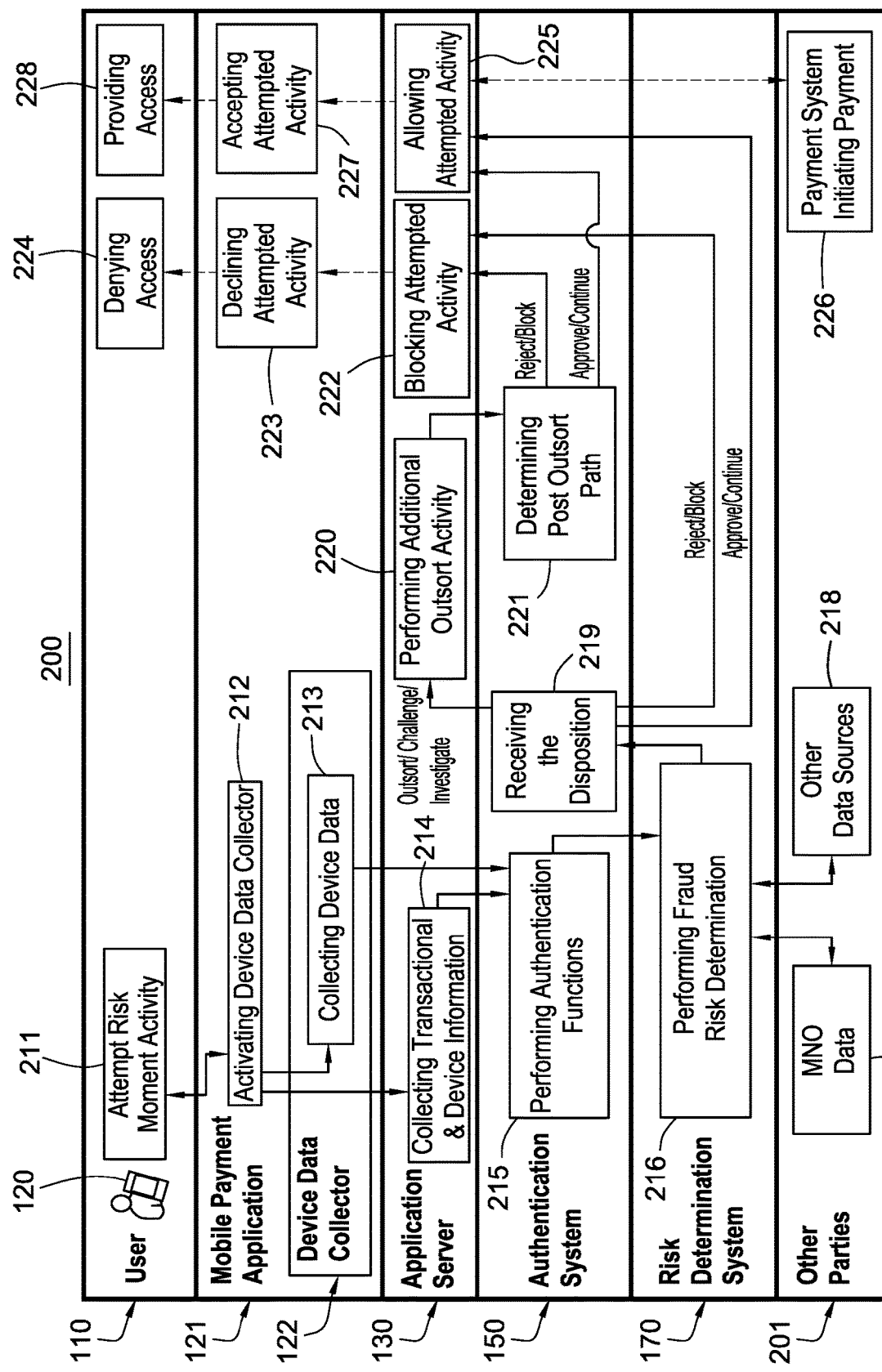
FIG. 2 illustrates an exemplary workflow for authentication and security for mobile-device transactions, according to an embodiment.

Turning ahead in the drawings, FIG. 2 illustrates an exemplary workflow 200 for authentication and security for mobile-device transactions, according to various embodiments. Workflow 200 is merely exemplary and is not limited to the embodiments presented herein. Workflow 200 can be employed in many different embodiments or examples not specifically depicted or described herein. In some embodiments, the procedures, the processes, and/or the activities of workflow 200 can be performed in the order presented. In other embodiments, the procedures, the processes, and/or the activities of workflow 200 can be performed in any suitable order. In still other embodiments, one or more of the procedures, the processes, and/or the activities of workflow 200 can be combined or skipped.

In many embodiments, workflow 200 can begin with a block 211 of user 110 using mobile device 120 to attempt an activity that qualifies as a risk moment. In a number of embodiments, user 110 can be a P2P user using a mobile payment application 121, such as a P2P application. When using mobile payment application 121, user 110 can attempt an activity that qualifies as a risk moment, such as one or more of the risk moments described above.

In several embodiments, workflow 200 can continue with a block 212 of mobile payment application 121 activating device data collector 122. In many embodiments, mobile payment application can provide P2P application functionality. In some embodiments, when user 110 attempts an activity that qualifies as a risk moment in block 211, mobile payment application 121 can initiate, activate, or otherwise call device data collector 122. In many embodiments, device data collector 122 can be a mobile software development kit (mSDK), which can run on mobile device 120 to collect information about user 110 and/or mobile device 120. In other embodiments, device data collector 122 can be can be a browser collector, such as a JavaScript collector. In various embodiments, device data collector 122 and/or mobile payment application 121 can send this information to application server 130. In some embodiments, application server 130 can trigger activating device data collector 122 to collect device data.

In many embodiments, workflow 200 can continue with a block 213 of device data collector 122 collecting device data from mobile device 120. In several embodiments, collection and/or generation of device data by device data collector 122 can occur at risk moments, and in some embodiments, also can occur at other times. In some embodiments, device data collector 122 can determine device history, location, behavioral consistency, and/or familiarity by collecting data entered by user 110 and/or collecting information based on user identity, behavior, and/or device-centric data elements in the native digital environment. Some data attributes for mobile device 120 can include, for example, a permanent device identifier, hardware tags, software tags, cell tower identifier, Wi-Fi network identifier and name, device location, mobile phone number pulled from user device 120, device name, screen resolution, crimeware (e.g., location spoofer) detection, malware detection, device fingerprint, IP (Internet Protocol) address, time zone, operating system, botnet signals, replay signals, data tampering, IP proxy, and/or other suitable information.

In a number of embodiments, device data collector 122 can include third-party components and/or plug-ins, which can be used to collect and/or generate additional information about mobile device 120. For example, a third-party component can be used to generate a permanent device ID on mobile devices (e.g., 120) that are iPhones. In several embodiments, device data collector 122 can call third-party data sources that are external from device data collector 122 and mobile payment application 121. For example, device data collector 122 can call a third party to see if the registrant's name is on the OFAC (Office of Foreign Assets Control) sanctions list. In a number of embodiments, device data collector 112 can communicate with authentication system 150, which can perform authentication (e.g., multi-factor authentication, sending a one-time password, etc.) for user 110 running mobile payment application 121 on mobile device 120, and/or generate and push risk signals (e.g., harvested data attributes) to risk determination system 170.

In some embodiments, device data collector 122 can communicate with mobile network operator 140 (FIG. 1), which provides cellular and/or wireless data services to mobile device 120, to obtain mobile network operator (MNO) data. In many embodiments, MNO data can include data that is collected by mobile network operators. Data attributes can include a persistent user identifier (e.g., user alias), identity elements (e.g., name, address, etc.), mobile phone number, current status or phone (e.g., ported), type of phone (e.g., prepaid, postpaid), tenure, network location, and/or other suitable information.

In various embodiments, device data collector 122 can perform various system-level checks. For example, device data collector 122 can run system rules that provide a system-level filter to prevent fraud. In many embodiments, the system-level filter can be a course, first filter. In some embodiments, these system rules can be general rules that apply for all transactions run through application server 130 and/or for all transactions involving accounts with a certain financial institution (e.g., 160 (FIG. 1)). These system-level and/or financial institution-level rules can provide general controls that are not data driven, e.g., that are agnostic to specific fraud modus operandi and/or fraud signals. For example, a financial institution (e.g., 160 (FIG. 1)) can specify transactional send limits (e.g., no transactions greater than $1,000), Bank Identification Number (BIN) card restrictions, or other general limits and/or controls. In many embodiments, the action attempted by user 110 in block 211 can be aborted if the system rules are not passed. In several embodiments, the information generated, collected, or otherwise harvested by device data collector 122 can be sent to application server 130.

In many embodiments, workflow 200 can continue with a block 214 of application server 130 performing collecting transactional and device information from mobile payment application 121 and/or device data collector 122 and sending this information to authentication system 150. In many embodiments, application server 130 can host, control access to, and manage the capabilities of mobile payment application 121 and/or device data collector 122. In some embodiments, various activities in block 213 can be performed in block 214, such as communicating with mobile network operator 160 (FIG. 1) to obtain MNO data, running system-level checks, calling authentication system 150, and/or or other suitable activities.

In several embodiments, workflow 200 can continue with a block 215 of authentication system 150 performing authentication functions. In many embodiments, authentication system 150 can perform multi-factor authentication. In some embodiments, multi-factor authentication can involve confirming the identity of the user (e.g., 110) using evidence in two or more factors. Factors can include knowledge (e.g., something only the user (e.g., 110) should know, such as passwords, PINs (personal identification numbers), answers to secret questions, etc.), possession (e.g., something only the user (e.g., 110) should have, such as security tokens, etc.), and/or inherence (e.g., something only the user (e.g., 110) is, such as biometric attributes, etc.).

In some embodiments, authentication system 150 can call card associations APIs (Application Programming Interfaces) to query and receive information about the card used for the transaction. For example, data can be queried and received from Visa and/or MasterCard API calls, which can be used to validate whether the card is valid, not reported as fraudulent, is consistent with the identity provided at enrollment, etc. In some embodiments, authentication system can make these API calls to verify a card security code, such as CVV (card verification value), CVV2 (card verification value 2), CVC (card validation code), etc.; to verify the ZIP code associated with the card or attempts made using other ZIP codes, to check whether the card has been reported lost, stolen, or counterfeit, or to check for reported fraud or compromise using the card or account. In several embodiments, authentication system 150 can collect event, transaction, and/or data, which in some embodiments can be performed asynchronously. In various embodiments, authentication system 150 can communicate, such as through API calls, to mobile network operator 140 (FIG. 1) to collect MNO data, as described above. In many embodiments, authentication system 150 can package and/or send the collected data to risk determination server 170.

In a number of embodiments, workflow 200 can continue with a block 216 of risk determination system 170 performing fraud risk determination. In many embodiments, risk determination system 170 can receive the data sent from authentication system 150 and/or application server 130. In several embodiments, risk determination system 170 can check that MNO data matches card and/or account data. In a number of embodiments, risk determination system 170 can pull and/or check related history, such as user accounts, devices, and transactions related to user 110 (or the purported user), mobile device 120, and or the underlying account(s). In some embodiments, transactional history and/or application history using mobile payment application 121 and/or application server 130 can be considered. For example, data attributes can include count of transactions, amount of transactions, user account tenure, time of transactions, velocities of accounts and/or payment instruments used, time duration since user actions, familiarity with sender and/or receiver, time in application, time on page, and/or other suitable information.

In many embodiments, risk determination system 170 can consider information collected from one or more financial institutions (e.g., 160 (FIG. 1)). In several embodiments, risk determination system 170 can consider bank identity header data elements, which can be data elements that indicate consistency between identity data entered by user 110 and identity information on record with application server 130, authentication system 150, risk determination system 170, and/or one or more financial institutions (e.g., 160 (FIG. 1)). In many embodiments, data attributes can include an indicator of whether an entered name and mobile device 120 (or phone number thereof) of user 110 have been used together historically within identity header data, an indicator of whether an entered name and entered email address have been used together historically within identity header data, and/or other suitable information.

In many embodiments, the data sources used by risk determination system 170 in determining fraud risk can include the data sources described above, including MNO data, device data, transactional and/or application history data, bank identity header data elements, card network association data, and/or other suitable data sources. In some embodiments, the data used by risk determination system 170 can be received from other sources, such as other parties 201, which can include MNO data 217 and/or other data sources 218. Other data sources 218 can include, for example, network data, network models, and/or data contributed by financial institutions (e.g., 160 (FIG. 1)).

In several embodiments, risk determination system 170 can use a risk model that is a rules-based approach to detect fraud. In many embodiments, these rules can be developed by fraud and risk subject matter experts (SME) to prevent systemic fraud using mobile payment application 121 and/or application server 130. In furtherance of this goal, risk signals can be used to create risk rules, which can be collectively used in a larger fraud risk model. The fraud risk model can output a fraud score and a series of triggered risk rules. Rule weights and decline thresholds can be established using fraud and risk prevention expertise and judgment or SMEs, and can be adjusted according to true fraud claims and model detection rates. Risk determination system 170 can use the fraud risk model to provide accept/decline treatments (e.g., outcomes) at risk moments. In many embodiments, the fraud risk model is not probabilistic in nature, but is instead based on rules developed by experts, such as SMEs.

In some embodiments, a risk signal can refer to a data attribute gleaned from a data source, such as the data sources described above. In many embodiments, a risk rule, or simple a rule, can refer to a decision rule or algorithm that can receive as input one or more risk signals, and, when triggered, can output a risk point score (or weight), which can be positive or negative. In a number of embodiments, a risk model, or fraud risk model, can refer to a subset of risk rules that can be tailored for a specific risk moment or use case, such as provisioning an account. In several embodiments, a risk score can be an output, such as a numeric output, which can be the sum of the risk points (or weights) for the triggered rules. In some embodiments, a risk treatment can refer to an action, such as an interdiction action, that a user (e.g., 110) can encounter based on the result of applying risk signals to the risk model. In several embodiments, a model threshold can refer to a score, such as a numerical score, above which an attempted action (e.g., provisioning, funds transfer, etc.) is declined, outsorted, and/or reviewed. In many embodiments, outsorting can refer to placing an attempted action in a pending state for further review and/or investigation.

In many embodiments, at the outset, the risk rules can be weighted according to SME experience. In several embodiments, the rules and/or weightings can be updated using data-driven modification based on information about true fraud events that occur. For example, application server 130, authentication system 150, and/or risk determination system 170 can receive transaction-level feedback from various financial institutions (e.g., 160 (FIG. 1)) regarding fraudulent transactions and blocked attempts. For example, bank-contributed fraud performance data can include true fraud data (e.g., data about actual frauds that occurred). This fraud feedback data can be used to shut down fraudulently opened accounts, re-credential compromised but otherwise legitimate accounts, build out negative watch lists for risk signals and/or other attributes associated with fraud (e.g., mobile devices (e.g., 120), MNO identifiers, Wi-Fi networks, etc.), monitor and/or tune system rules, risk models, and/or risk rules, and/or identify and respond to fraud modi operandi (MOs).

In many embodiments, the risk model can advantageously separate good and bad actors. True positive detection and true negative outcomes can result in a vast majority of cases, but there can be cases of false positives (e.g., friction for true good users), and false negatives (e.g., non-friction for true bad actors). In each of these cases, both consumer operations and fraud operations can work together to remediate the situation by tuning the risk model. Further, and as previously mentioned, financial institutions (e.g., 160 (FIG. 1)) can contribute fraud feedback data to application server 130, authentication system 150, and/or risk determination system 170. There can be cases in which the financial institution (e.g., 160 (FIG. 1)) incorrectly classifies a good user as fraudulent. When this situation occurs, the financial institution can be notified to correct the data contribution and reflect ground truth.

In various embodiments, application server 130, authentication system 150, and/or risk determination system 170 can share information with one or more of the financial institutions (e.g., 160 (FIG. 1)) based on outcomes of applying the risk model in risk determination system 170. This data can be used by the financial institutions (e.g., 160 (FIG. 1)) to enhance their risk determination processes. For example, outcomes, one or more of the risk signals that triggered one or more rules, and/or the one or more trigger rules can be provided to the financial institutions (e.g., 160). In some embodiments, the information provided can be different depending on whether the financial institution (e.g., 160 (FIG. 1)) is sending or receiving funds in a funds transfer.

Figure 3:
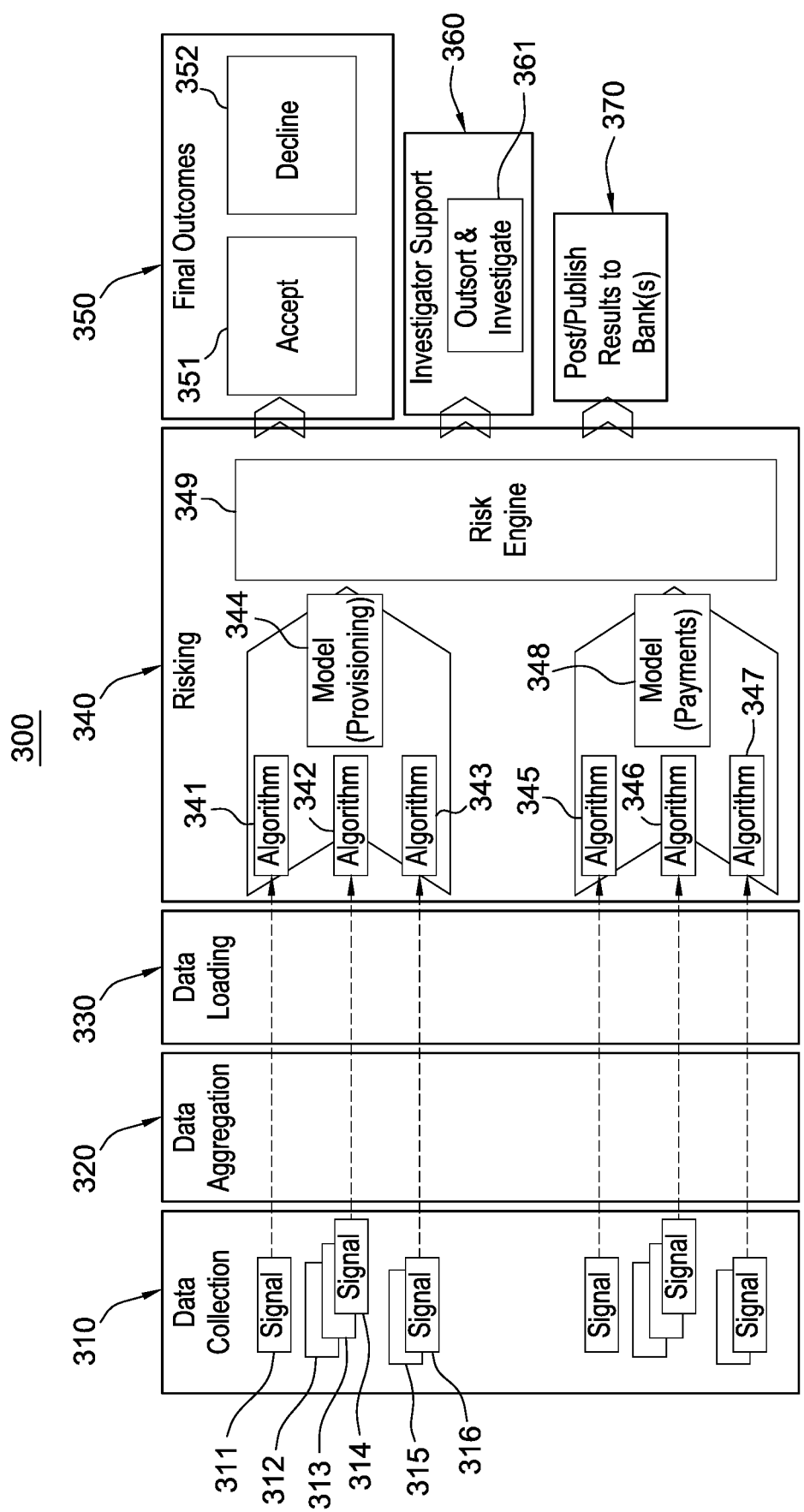
FIG. 3 illustrates an exemplary workflow for risk determination, according to an embodiment.

Turning ahead in the drawings, FIG. 3 illustrates an exemplary workflow 300 for risk determination, according to various embodiments. Workflow 300 is merely exemplary and is not limited to the embodiments presented herein. Workflow 300 can be employed in many different embodiments or examples not specifically depicted or described herein. In some embodiments, the procedures, the processes, and/or the activities of workflow 300 can be performed in the order presented. In other embodiments, the procedures, the processes, and/or the activities of workflow 300 can be performed in any suitable order. In still other embodiments, one or more of the procedures, the processes, and/or the activities of workflow 300 can be combined or skipped. In a number of embodiments, workflow 300 can be performed by risk determination system 170 (FIGS. 1-2). In some embodiments, one or more of the procedures, the processes, and/or the activities of workflow 300 can be performed instead or at least partially by application server 130 (FIGS. 1-2) and/or authentication system 150 (FIGS. 1-2). In several embodiments, block 216 (FIG. 2) can include performing all or a portion of workflow 300.

In many embodiments, workflow 300 can include a block 310 of data collection, which can include collecting risk signals (e.g., signals 311-316). These risk signals can be similar or identical to the risk signals described above. In many embodiments, workflow 300 next can include a block 320 of data aggregation, which can include aggregating the risk signals. In several embodiments, workflow 300 next can include a block 330 of data loading, which can include transforming data into forms that can be used by a risk engine 349. In many embodiments, the raw (pre-transformed data) can be kept as well. In several embodiments, the raw and/or transformed data can be loaded into risk engine 349.

In several embodiments, workflow 300 next can include a block 340 of risk determination (which can also be referred to as "risking"). In many embodiments, block 340 can include executing risk engine 349, which can include running one or more risk models, such as risk models 344 and/or 348. In many embodiments, each model (e.g., 344, 348) can include a subset of risk rules, such as algorithms 341-343 to model 344 and algorithms 345-347 for model 348. For example, model 344 can be the risk model that is used for a provisioning attempt, and algorithms 341-343 can be the risk rules that are run under the risk model for provisioning attempts. As another example, model 348 can be the risk model that is used for a payment (e.g., funds transfer), and algorithms 345-347 can be the risk rules that are run under the risk model for payments. In many embodiments, each risk rule can take one or more signals as input. For example, algorithm 341 can take signal 311 as an input, algorithm 342 can take signals 312-314 as inputs, and algorithm 343 can take signals 315-316 as inputs.

In many embodiments, workflow 300 next can include a block 350 of providing a final outcome and/or block 360 or recommending investigator support. In a number of embodiments, block 350 of providing a final outcome can include a determination to accept 351 or a determination to decline 352. Determination to accept 351 can involve allowing the attempted action (e.g., provisioning a card, permitting access, initiating payment) to proceed. Determination to decline 352 can involve preventing the attempted action (e.g., blocking provisioning, blocking access, or not allowing payment). In several embodiments, block 360 of recommending investigator support can include a determination to outsort and investigate 361, which can involve further investigation.

In some embodiments, workflow 300 also can include a block 370 of publishing results to one or more financial institutions. For example, financial institutions (e.g., 160 (FIG. 1)) maintaining the accounts involved in the attempted action can be notified of the results and/or risk signals involved in the determinations (e.g., 351, 352, 361).

In various embodiments, the risk engine-based approach can allow for risk rules and/or rule weights to be updated regularly to fine-tune the outcomes of the risk engine, which can advantageously fight emerging and/or dynamic fraud threats. The risk rules can be created based on the risk signals, and these risk rules can collectively be used in the larger fraud risk model. Rule points/weights and decline thresholds can be established and adjusted according to true fraud claims and model detection rates.

In many embodiments, the risk engine in risk determination system 170 (FIGS. 1-2) can be based on the risk signals (e.g., signals 311-316) that are fed in and the risk rules (e.g., algorithms 341-343, 345-347) that allow for deriving meaning from the risk signals. Risk signals and risk rules can detect good signs as well as fraud signatures. In many embodiments, some or all of the risk rules can be stateless, relying only on current data. In the same or other embodiments, some or all of the risk rules can use lookups and/or lists. In the same or other embodiments, some or all of the risk rules can be based at least in part on historical data. A grouping of algorithms collectively can make up a risk model. The risk model can be run in the risk engine to provide accept/decline/outsort outcomes at risk moments.

In several embodiments, various different types of risk rules can be used in various models. For example, risk rule types can include:

Negative lists/watch lists/blacklists, which can involve watching for risk signals associated with past fraud (e.g., mobile device (e.g., 120 (FIGS. 1-2)), IP address, email address, phone number, alias, etc.);

Velocities, which can involve counts of activity with a common anchor point or risk signal, which in some rules can be within a fixed period of time, which can show a likelihood of suspicious activity (e.g., same device registering for three user accounts within two hours);

Familiarity, which can involve determining if a risk signal has been associated with an account in the past, especially past good behavior (e.g., the same alias made good transactions on this user account three months ago);

Integrity, which can involve determining if there is anything that makes the client device or anything else more susceptible to being victimized or more likely to be a fraudster (e.g., malware, crimeware, root, jailbreak);

Obfuscation, which can involve determining if the user (e.g., 110 (FIGS. 1-2)) is actively trying to hide or change data (e.g., location spoofing, proxying IP, spoofing user agent);

Behavioral/Combinations, which can involve determining when certain patterns or sets of features are associated with higher risk (e.g., the user just registered and is immediately attempting to send a payment is over $800); and Other Risk Rules, which can involve other types of rules, such as determining mismatches, anomalies, etc., that are inconsistent with genuine user behavior, inconsistent with other data, or are artifacts of a fraud attack (battery plugged in/100%, no accelerometer movement, bot or script detected, foreign carrier network, etc.).

In many embodiments, different types of risk models can be developed with different rules that are relevant to different types of actions attempted by users (e.g., 110 (FIGS. 1-2)). In some embodiments, a series of signals can be collected for the risk model from various data sources (e.g., on-device, mobile network operator, in-application history, card association APIs, etc.). In many embodiments, signals can be aggregated and/or translated to be applied into a set of rules (e.g., positive or negative rules) in the risk model. In several embodiments, at a risk moment, risk rules can trigger in the risk model depending on the underlying characteristics of the transaction and/or user behavior/interaction, which result in a risk score. In various embodiments, risk points can be added to the risk score if a negative rule is triggered. In some embodiments, risk points can be subtracted from the risk score if a positive rule is triggered. In several embodiments, risk points can be tallied from each rule and create a total score. In many embodiments, if the score is above a defined threshold (e.g., decline threshold) the attempted action can be declined for potential fraud. In several embodiments, transactional fraud feedback data can subsequently be received, which can be matched into transactions for adjusting/tuning of individual rules to true fraud, and seeding blacklists with risk signals (e.g., mobile devices (e.g., 120 (FIGS. 1-2), IP Addresses, etc.) belonging to fraudsters. In a number of embodiments, the "levers and knobs" of the risk model that allow it to be tuned and/or calibrated for improving possible detection are the set of risk rules included, the risk points/scores/weights, thresholds for each risk rule, and the thresholds for the overall model. The weights can indicate a relative riskiness of an attempted action. Table 1 below shows a decline threshold for a provisioning risk model, and also shows statistical outcomes of the risk model, and Table 2 below shows an example set of risk rules that are applied for the provisioning risk model, along with the score and statistical outcomes for the rules.

TABLE 1

| | |
|---|---|
| Decline Threshold | 1000 |
| Fraud Caught # | 291 |
| Fraud Caught % | 95% |
| Fraud Missed # | 16 |
| Fraud Missed % | 5.2% |
| False Positive # | 128 |
| False Positive % | 31% |
| Fraud $ Caught | 380,601 |
| Fraud $ Caught % | 96% |
| Fraud $ Missed | 14,584 |
| Fraud $ Missed % | 4% |

TABLE 2

| Rule ID | Rule Description | Score | Out-sort | Fraud | Hit Rate |
|---|---|---|---|---|---|
| LOCF6 | Location Sources Mismatch - Location Is Being Spoofed | 2000 | 5 | 5 | 100% |
| AMTG6 | Amount Larger than 1000 | 500 | 77 | 60 | 78% |
| FSNSR | Fusion Score > 900 (High Risk) | 100 | 41 | 27 | 66% |
| BRWC1 | Browser language is associated with a high risk country | 100 | 33 | 24 | 73% |
| MNON | MNO - Full Name Matches Card (Level) | −500 | 6 | 0 | 0% |

In many embodiments, the decline threshold (as shown in Table 1) and/or scores associated with risk rules (as shown in Table 2) can be adjusted to tune the risk model based on actual data, such as details of fraud that were not previously caught and the associated risk signals. As shown in Table 2, some rules can have positive scores, which can correspond to potentially high-risk situations, and, if triggered, can increase the risk score. Other rules can have negative scores, which can correspond to low-risk situations, and, if triggered, can decrease the risk score.

As an example, a user (e.g., 110 (FIGS. 1-2)) identified as "John Doe" can create a profile in mobile payment application 121 (FIGS. 1-2), and can attempt to provision a debit card. Table 3 below show rules triggered by the various characteristics of the data, which can be based on one or more risk signals. In many embodiments, the attempted action can generate a number of risk signals, which can be positive and/or negative. Various rules can be triggered, which can add or subtract risk points. In the example shown in Table 3, John Doe's risk score is 2850, which can exceed the decline threshold of 1000, indicating that card provisioning fraud is likely. In many embodiments, the provisioning attempt can be declined. In other embodiments, the provisioning attempt can be outsorted.

TABLE 3

| Characteristic | Rule Triggered | Points |
|---|---|---|
| Location Spoofing | LOCF6 | 2000 |
| Device Language is Russian | BRWC1 | 250 |
| Amount = $1250 | AMTG6 | 500 |
| Sender/Receiver Unfamiliar | FSNSR | 100 |
| Total Risk Score | | 2850 |

In many embodiments, the risk rules can be created based on risk signals that are available from the various data sources. A subset of risk rules can execute for interactions of a user (e.g., 110 (FIGS. 1-2)) at each risk moment, as described above. In several embodiments, risk points (e.g., scores for a risk rule) can be tallied from each rule, and if the total risk score is above a defined threshold, the action can be outsorted or declined for potential fraud. In some embodiments, different thresholds can be used for outsorting and declining. For example, the outsorting threshold can be lower than the declining threshold. The disposition (e.g., approve, outsort, decline) can be sent returned to authentication server 150 and/or application server 130, and/or in some embodiments can be sent to the one or more financial institutions (e.g., 160 (FIG. 1)) involved. In many embodiments, the rules can number in the hundred or even thousands, and can be categorized by groups and types (each of which may have one, two, three, or many rules), an example of which is shown below in Table 4.

TABLE 4

| Group | Type |
|---|---|
| MNO-Based | Application Alias |
| MNO-Based | MNO Identity |
| MNO-Based | MNO Status |
| MNO-Based | Number Verification |
| MNO-Based | Network Location |
| MNO-Based | MNO Status |
| Miscellaneous | Miscellaneous |
| On-Device (Mobile App/SDK) | Device ID |
| On-Device (Mobile App/SDK) | Cell ID |
| On-Device (Mobile App/SDK) | Wi-Fi base identifier |
| On-Device (Mobile App/SDK) | App Store ID |
| On-Device (Mobile App/SDK) | Deep Location |
| On-Device (Mobile App/SDK) | Mobile Phone |
| On-Device (Mobile App/SDK) | Dynamic ID |
| On-Device (Mobile App/SDK) | SIM Number |
| On-Device (Mobile App/SDK) | Battery |
| On-Device (Mobile App/SDK) | Emulator |
| On-Device (Mobile App/SDK) | Accelerometer |
| On-Device (Mobile App/SDK) | Carrier |
| On-Device (Mobile App/SDK) | Make/Model |
| On-Device (Mobile App/SDK) | Version OS |
| On-Device (Mobile App/SDK) | Country Code |
| On-Device (Mobile App/SDK) | Device Name |
| On-Device (Mobile App/SDK) | Root/Jailbreak |
| On-Device (Mobile App/SDK) | Crimeware |
| On-Device (Mobile App/SDK) | Malware |
| On-Device (Mobile App/SDK) | Impossible |
| App & Browser | IP Address |
| Browser | Device Fingerprint |
| Browser | Device Tags |
| Browser | Malware Attack |
| Browser | Botnet Victim |
| Browser | Non-Human Input |
| Browser | Fraud Signals |
| Browser | Replay Attack Signal |
| Browser | Data Tampering |
| Browser | Proxy Alert |
| Browser | Geolocation |
| Browser | Cookie/LSO Match |
| Browser | Insufficient Page |
| Browser | Negative Referring |

TABLE 4-continued

| Group | Type |
| --- | --- |
| Browser | Missing Whitelisted |
| Transaction History | Transaction History |
| Card Association Checks | Card Association |
| Event/Transaction Data | Payment Instrument |
| Event/Transaction Data | Entered Data |
| Event/Transaction Data | Time |
| Event/Transaction Data | Event/Transaction |
| In App Data | Transactional Behavioral |
| Dummied CXC Rules | Dummied CXC |
| Bank Identity Rules | Bank Identity |
| Visa/MasterCard Risk APIs | Visa Funds Transfer |
| Visa/MasterCard Risk APIs | Visa General |
| Visa/MasterCard Risk APIs | Visa Payment |
| Visa/MasterCard Risk APIs | Visa Watch List |
| Visa/MasterCard Risk APIs | MC Account |
| Visa/MasterCard Risk APIs | MC List-Stolen |
| Visa/MasterCard Risk APIs | MC Fraud Scoring |
| Visa/MasterCard Risk APIs | Visa Transaction |
| Visa/MasterCard Risk APIs | MC Sanction |

In many embodiments, the decline score threshold can be varied and tuned to adjust to emerging and/or dynamic fraud threats. For example, the threshold can be set to 1500. In some embodiments, the threshold adjustment can be made by SMEs based on intelligence gleaned from transactional fraud feedback and/or statistics related to risk rule and/or risk model effectiveness.

In several embodiments, risk rule tuning can be contingent on receiving "ground truth" fraud feedback data, such as bank-contributed fraud performance data described above. In many embodiments, statistical measures of effectiveness can be used to consider adjustments to rule weighting (e.g., rule points/rule scores) within the model based on one or more of the following factors, for example:

Coverage, which can involve considering the percentage of total transactions flagged by the rule, in which case a lower percentage can be better;

Detection, which can involve considering the percentage of total fraudulent transactions flagged by the rule, or the percentage of total fraudulent dollars flagged by the rule, in which case a higher can be better;

Hit Rate, which can involve considering the percentage of flagged transactions that were actually fraudulent, in which case a higher percentage can be better;

Lift, which can involve considering how much better a rule does when compared to random selection, such as based on detection divided by coverage, where 1.0 corresponds to random selection;

False Positive Rate, which can involve considering the proportion of good users tagged as bad by model; and False Negative Rate, which can involve considering the proportion of bad users tagged as good by model.

In many embodiments, customized risk rules can be created based on specific feedback data. For example, blacklist risk rules can be developed based on specific fraud risk signals used in the past.

In a number of embodiments, risk determination system 170 (FIGS. 1-2) can beneficially facilitate detecting and/or preventing fraud. The risks of fraud in mobile-device transactions can be different from other forms of risks, such as the risk of a customer defaulting on a loan, and fraud risks are not as probabilistic as other risks. Specifically, fraudsters constantly change to get around fraud prevention controls, which can make machine-learning techniques harder to apply to fraudsters. In many embodiments, the risk rules can be modified and/or tuned frequently (e.g., hourly, daily, weekly, etc.) to adjust to emerging threats. By relying on data from many sources, as described above, including, for example, device-centric data, MNO data, financial institution data, card association data, etc., risk determination system 170 (FIGS. 1-2) can beneficially facilitate preventing access to bad actors and limiting disruptions to good actors. In the vast majority of cases, risk determination system 170 (FIGS. 1-2) can determine that an actual good actor is a good actor (i.e., "true good user") and approve the transaction without friction (e.g., outsort or declined dispositions), and can determine that an actual bad actor is a bad actor (i.e., "true bad user") to prevent access (e.g., decline disposition). In some limited cases, however, risk determination system 170 (FIGS. 1-2) can provide "false negative" dispositions, in which actual bad actors are determined to be good actors, which can result in non-friction for actual bad actors. In other limited cases, risk determination system 170 (FIGS. 1-2) can provide "false positive" dispositions, in which actual good actors are determined to be potentially bad actors, which can result in friction for actual good actors. In the cases of false negatives and false positives, the risk rules can be modified and/or the weightings tuned to more accurately reflect ground truth. In the cases of false negatives, false positives, and true bad users, the risk signals can be examined to determine how the risk rules and/or risk models can be modified to better prevent fraud.

Returning to FIG. 2, in a number of embodiments, workflow 200 can continue with a block 219 of authentication system 150 receiving the disposition (e.g., approve, outsort, decline) after risk determination system 170 performs the fraud risk determination in block 216. In some embodiments, the risk score and/or other information relevant to the determination of the disposition, such as the triggering rules and the risk signals involved, can be sent to authentication system 150 from risk determination system 170. In several embodiments, the disposition can be sent to authentication system 150 in real-time after the attempted action is request from user 110.

In many embodiments, when the disposition is outsort, workflow 200 can continue with a block 220 of authentication system 150 performing additional outsort activity. In several embodiments, outsort activity can seek higher levels of proof to authenticate the attempted action. As an example of outsort activity, a challenge can be issued to user 110, such as seeking bank credentials, sending a push alert seeking approval to a previously trusted device, sending an out-of-band message, such as through a fortified SMS (short message service) text message exchange or email, validating and/or re-entering card data (e.g., PAN (primary account number) and CVV2). As another example of outsort activity, a fraud investigator can perform a further review of the transaction or attempted action, including the parties involved, the devices (e.g., mobile device 120), etc. In some instances, for example, the fraud investigator can contact user 110 and/or the purported user through previously verified devices. In many embodiments, the status of the attempted action can be shown as "pending" during the outsort activity. In several embodiments, after the challenge or investigation, the attempted action can be approved (allowed) or declined (rejected).

In a number of embodiments, potentially risky actions can be approved, but flagged internally. For example, a provisioning of a card that indicated some risk can be approved, but flagged for higher scrutiny when a funds transfer is later attempted. In many embodiments, one or more of the financial institutions (e.g., 160 (FIG. 1)) can be informed of risk scores and/or factors in the disposition decision. In some embodiments, the limits for user 110 can be adjusted based on the disposition, such as altering the amount of funds that can be transfer in a transaction, the cumulative amount funds that can be transfer over a given time period, the number of transactions allowed over a given time period, etc.

In many embodiments, workflow 200 can continue with a block 221 of authentication system 150 determining the appropriate post-outsort path. For example, after the outsort activity, the disposition can be changed to approve or decline based on the outcome of the outsort activity.

In several embodiments, when the disposition is set to "declined" in block 219 or 221, workflow 200 can continue with a block 222 of application server 130 blocking the attempted activity. For example, application server 130 can deny access to the user account or prevent an attempted funds transfer from being initiated.

In some embodiments, workflow 200 can continue with a block 223 of mobile payment application 121 declining the attempted activity on mobile payment application 121. For example, mobile payment application 121 can present user 110 with a message that the attempted action was not successful or denying further access to the user account, which can be viewed by user 110 in a block 224.

In several embodiments, when the disposition is set to "approved" in block 219 or 221, workflow 200 can continue with a block 225 of application server 130 allowing the attempted activity. For example, application server 130 can allow access to the user account, inform user 110 of a successful action, complete a provisioning by associating an account or card to the user account, and/or initiating payment.

In many embodiments, when the attempted action is a funds transfer, workflow 200 can continue with a block 226 of a payment system initiating payment and/or transfer of the funds requested by user 110.

In several embodiments, workflow 200 can continue from block 225 with a block 227 of mobile payment application 121 accepting the attempted activity on mobile payment application 121. For example, mobile payment application 121 can present user 110 with a message that the attempted action was successful or providing the requested access to the user account, which can be viewed by user 110 in a block 228.

Figure 5:
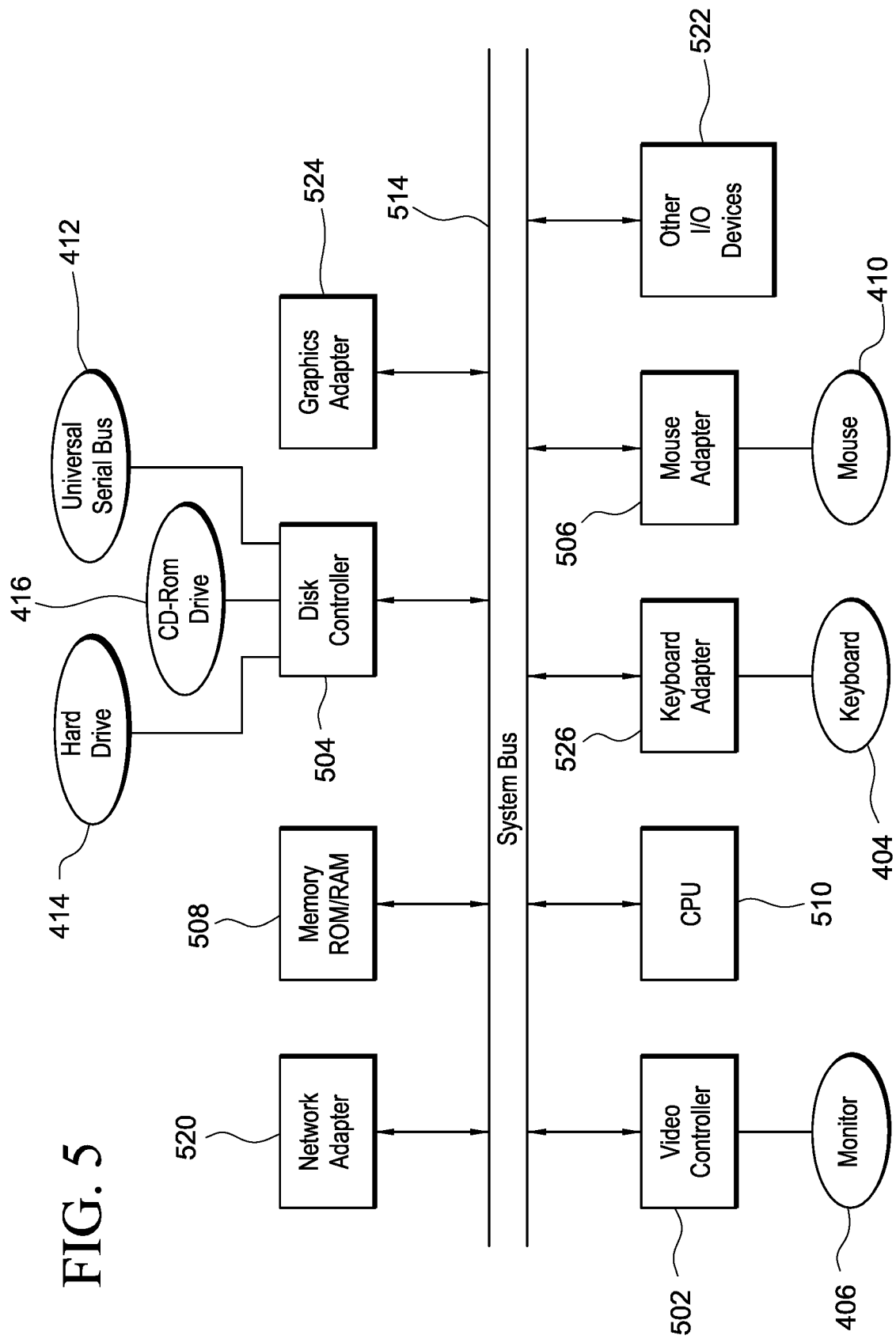
FIG. 5 illustrates a representative block diagram of an example of elements included in circuit boards inside a chassis of the computer of FIG. 4.

Turning ahead in the drawings, FIG. 4 illustrates an exemplary embodiment of a computer system 400, all of which or a portion of which can be suitable for (i) implementing part or all of one or more embodiments of the techniques, methods, and systems and/or (ii) implementing and/or operating part or all of one or more embodiments of the non-transitory computer readable media described herein. As an example, a different or separate one of a chassis 402 (and its internal components) can be suitable for implementing the techniques described herein. Furthermore, one or more elements of computer system 400 (e.g., a refreshing monitor 406, a keyboard 404, and/or a mouse 410, etc.) can also be appropriate for implementing the techniques described herein. Computer system 400 can comprise chassis 402 containing one or more circuit boards (not shown), a Universal Serial Bus (USB) port 412, a Compact Disc Read-Only Memory (CD-ROM) and/or Digital Video Disc (DVD) drive 416, and a hard drive 414. A representative block diagram of the elements included on the circuit boards inside chassis 402 is shown in FIG. 5. A central processing unit (CPU) 510 in FIG. 5 is coupled to a system bus 514 in FIG. 5. In various embodiments, the architecture of CPU 510 can be compliant with any of a variety of commercially distributed architecture families.

Continuing with FIG. 5, system bus 514 also is coupled to memory storage unit 508 that includes both read only memory (ROM) and random access memory (RAM). Non-volatile portions of memory storage unit 508 or the ROM can be encoded with a boot code sequence suitable for restoring computer system 400 (FIG. 4) to a functional state after a system reset. In addition, memory storage unit 508 can include microcode such as a Basic Input-Output System (BIOS). In some examples, the one or more memory storage units of the various embodiments disclosed herein can include memory storage unit 508, a USB-equipped electronic device (e.g., an external memory storage unit (not shown) coupled to universal serial bus (USB) port 412 (FIGS. 4-5)), hard drive 414 (FIGS. 4-5), and/or CD-ROM, DVD, Blu-Ray, or other suitable media, such as media configured to be used in CD-ROM or DVD drive 416 (FIGS. 4-5). Non-volatile or non-transitory memory storage unit(s) refer to the portions of the memory storage units(s) that are non-volatile (e.g., non-transitory) memory. In the same or different examples, the one or more memory storage units of the various embodiments disclosed herein can include an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can include Microsoft® Windows® operating system (OS), Mac® OS, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 510.

In the depicted embodiment of FIG. 5, various I/O devices such as a disk controller 504, a graphics adapter 524, a video controller 502, a keyboard adapter 526, a mouse adapter 506, a network adapter 520, and other I/O devices 522 can be coupled to system bus 514. Keyboard adapter 526 and mouse adapter 506 are coupled to keyboard 404 (FIGS. 4-5) and mouse 410 (FIGS. 4-5), respectively, of computer system 400 (FIG. 4). While graphics adapter 524 and video controller 502 are indicated as distinct units in FIG. 5, video controller 502 can be integrated into graphics adapter 524, or vice versa in other embodiments. Video controller 502 is suitable for refreshing monitor 406 (FIGS. 4-5) to display images on a screen 408 (FIG. 4) of computer system 400 (FIG. 4). Disk controller 504 can control hard drive 414 (FIGS. 4-5), USB port 412 (FIGS. 4-5), and CD-ROM drive 416 (FIGS. 4-5). In other embodiments, distinct units can be used to control each of these devices separately.

In some embodiments, network adapter 520 can comprise and/or be implemented as a WNIC (wireless network interface controller) card (not shown) plugged or coupled to an expansion port (not shown) in computer system 400 (FIG. 4). In other embodiments, the WNIC card can be a wireless network card built into computer system 400 (FIG. 4). A wireless network adapter can be built into computer system 400 by having wireless communication capabilities integrated into the motherboard chipset (not shown), or implemented via one or more dedicated wireless communication chips (not shown), connected through a PCI (peripheral component interconnector) or a PCI express bus of computer system 400 (FIG. 4) or USB port 412 (FIG. 4). In other embodiments, network adapter 520 can comprise and/or be implemented as a wired network interface controller card (not shown).

Although many other components of computer system 400 (FIG. 4) are not shown, such components and their interconnection are well known to those of ordinary skill in the art. Accordingly, further details concerning the construction and composition of computer system 400 and the circuit boards inside chassis 402 (FIG. 4) are not discussed herein.

When computer system 400 in FIG. 4 is running, program instructions stored on a USB-equipped electronic device connected to USB port 412, on a CD-ROM or DVD in CD-ROM and/or DVD drive 416, on hard drive 414, or in memory storage unit 508 (FIG. 5) are executed by CPU 510 (FIG. 5). A portion of the program instructions, stored on these devices, can be suitable for carrying out all or at least part of the techniques described herein. In various embodiments, computer system 400 can be reprogrammed with one or more modules, system, applications, and/or databases, such as those described herein, to convert a general purpose computer to a special purpose computer. For purposes of illustration, programs and other executable program components are shown herein as discrete systems, although it is understood that such programs and components may reside at various times in different storage components of computing device 400, and can be executed by CPU 510. Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs.

Although computer system 400 is illustrated as a desktop computer in FIG. 4, there can be examples where computer system 400 may take a different form factor while still having functional elements similar to those described for computer system 400. In some embodiments, computer system 400 may comprise a single computer, a single server, or a cluster or collection of computers or servers, or a cloud of computers or servers. Typically, a cluster or collection of servers can be used when the demand on computer system 400 exceeds the reasonable capability of a single server or computer. In certain embodiments, computer system 400 may comprise a portable computer, such as a laptop computer. In certain other embodiments, computer system 400 may comprise a mobile device, such as a smart phone. In certain additional embodiments, computer system 400 may comprise an embedded system.

Figure 6:
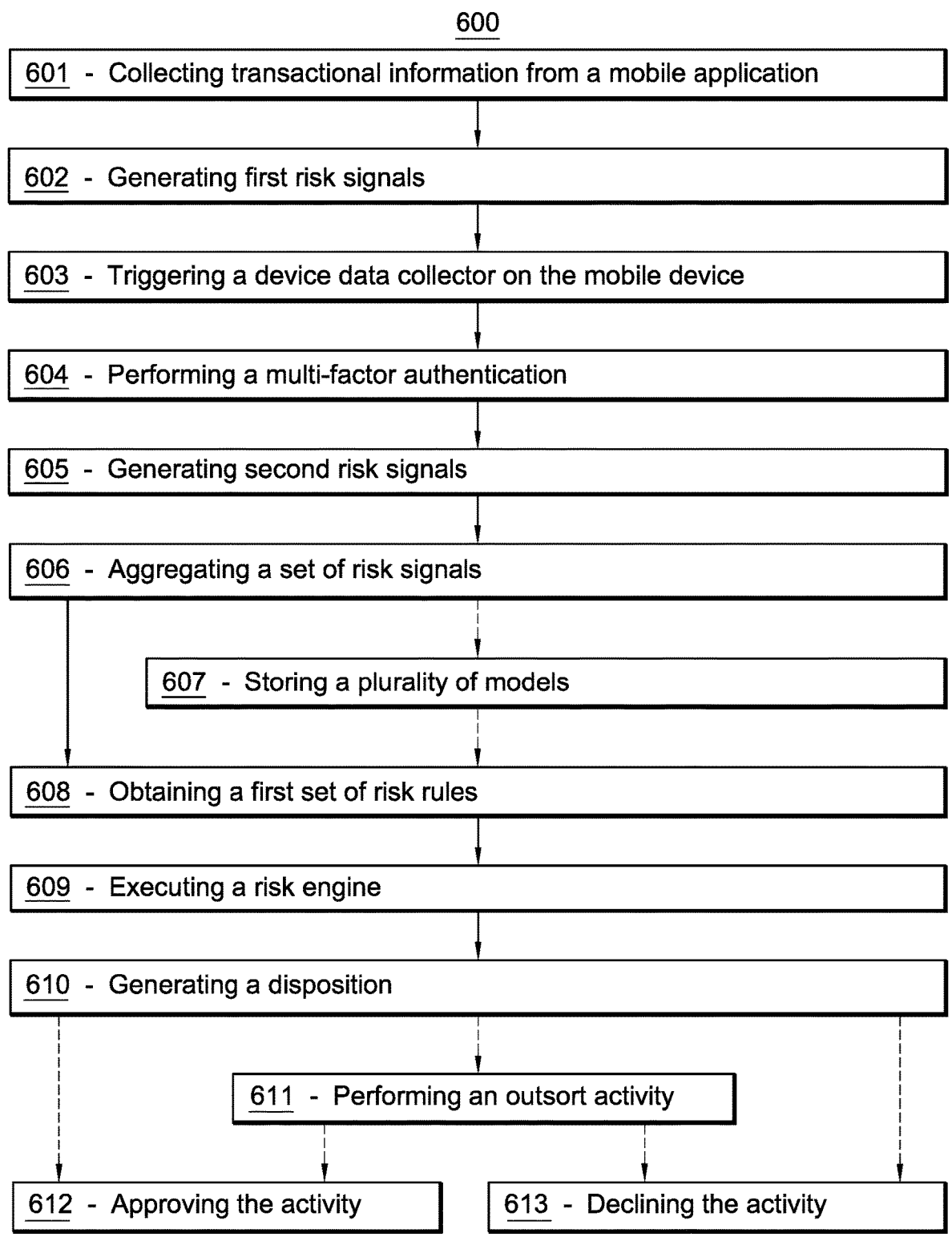
FIG. 6 illustrates a flow chart for a method, according to another embodiment.

Turning ahead in the drawings, FIG. 6 illustrates a flow chart for a method 600. In some embodiments, method 600 can be a method of performing authentication and security for mobile-device transactions. Method 600 is merely exemplary and is not limited to the embodiments presented herein. Method 600 can be employed in many different embodiments or examples not specifically depicted or described herein. In some embodiments, the procedures, the processes, and/or the activities of method 600 can be performed in the order presented. In other embodiments, the procedures, the processes, and/or the activities of method 600 can be performed in any suitable order. In still other embodiments, one or more of the procedures, the processes, and/or the activities of method 600 can be combined or skipped.

In many embodiments, one or more of application server 130 (FIGS. 1-2), authentication system 150 (FIGS. 1-2), and/or risk determination system 170 (FIGS. 1-2) can be suitable to perform method 600 and/or one or more of the activities of method 600. In these or other embodiments, one or more of the activities of method 600 can be implemented as one or more computing instructions configured to run at one or more processors and configured to be stored at one or more non-transitory computer readable media. Such non-transitory computer readable media can be part of one or more computer systems, such as application server 130 (FIGS. 1-2), authentication system 150 (FIGS. 1-2), and/or risk determination system 170 (FIGS. 1-2). The processor(s) can be similar or identical to the processor(s) described above with respect to computer system 400 (FIG. 4).

In some embodiments, method 600 and other blocks in method 600 can include using a distributed network including distributed memory architecture to perform the associated activity. This distributed architecture can reduce the impact on the network and system resources to reduce congestion in bottlenecks while still allowing data to be accessible from a central location.

Referring to FIG. 6, method 600 can include a block 601 of collecting transactional information from a mobile application on the mobile device. In many embodiments, the mobile device can be used by a user to initiate an activity at a risk moment. The mobile device can be similar or identical to mobile device 120 (FIGS. 1-2). The mobile application can be similar or identical to mobile payment application 121 (FIGS. 1-2). The user can be similar or identical to user 110 (FIGS. 1-2). In many embodiments, the transactional information can be similar or identical to the information collected in block 214 (FIG. 2). In several embodiments, the activity initiated by the user can be similar or identical to the activity that qualifies as a risk moment in block 211 (FIG. 2). In some embodiments, block 601 can be performed by application server 130 (FIGS. 1-2). In the same or other embodiments, block 601 can be performed at least in part by authentication system 150 (FIGS. 1-2) and/or risk determination system 170 (FIGS. 1-2).

In a number of embodiments, method 600 also can include a block 602 of generating first risk signals based on the transactional information collected from the mobile application. The first risk signals can be data attributes collected in the transactional information collected in block 601. The first risk signals can be similar or identical to risk signals 311-316 (FIG. 3). In some embodiments, block 602 can be performed by application server 130 (FIGS. 1-2). In the same or other embodiments, block 602 can be performed at least in part by authentication system 150 (FIGS. 1-2) and/or risk determination system 170 (FIGS. 1-2).

In several embodiments, method 600 additionally can include a block 603 of triggering a device data collector on the mobile device to collect device data on the mobile device. The device data collector can be similar or identical to device data collector 122 (FIGS. 1-2). In many embodiments, the device data can be similar or identical to the device data collected in block 213 (FIG. 2). In some embodiments, block 603 can be performed by authentication system 150 (FIGS. 1-2). In the same or other embodiments, block 603 can be performed at least in part by application server 130 (FIGS. 1-2) and/or risk determination system 170 (FIGS. 1-2).

In a number of embodiments, method 600 further can include a block 604 of performing a multi-factor authentication. In some embodiments, the multi-factor authentication be similar or identical to the multi-factor authentication performed in block 215 (FIG. 2), which can involve confirming the identity of the user using evidence in two or more factors. For example, factors can include knowledge (e.g., something only the user should know, such as passwords, PINs, answers to secret questions, etc.), possession (e.g., something only the user should have, such as security tokens, etc.), and/or inherence (e.g., something only the user is, such as biometric attributes, etc.). In several embodiments, the multi-factor authentication can be based at least in part on: (a) the device data, and (b) information obtained from one or more calls to at least one of: (i) a mobile network operator for the mobile device, or (ii) a card network that handles transactions for a card that is associated with the activity. The information obtained from the card network can be similar or identical to information used to verify a card security code, such as CVV, CVV2, CVC, etc.; to verify the ZIP code associated with the card or attempts made using other ZIP codes, to check whether the card has been reported lost, stolen, or counterfeit, or to check for reported fraud or compromise using the card or account. The mobile network operator can be similar or identical to mobile network operator 140 (FIG. 1), which can provide mobile network operator data, such as mobile network operator data 217 (FIG. 2). In some embodiments, block 604 can be performed by authentication system 150 (FIGS. 1-2). In the same or other embodiments, block 604 can be performed at least in part by application server 130 (FIGS. 1-2) and/or risk determination system 170 (FIGS. 1-2).

In several embodiments, method 600 additionally can include a block 605 of generating second risk signals based on the device data and results of performing the multi-factor authentication. The second risk signals can be data attributes collected in blocks 603 and/or 604. The second risk signals can be similar or identical to risk signals 311-316 (FIG. 3). In some embodiments, block 605 can be performed by authentication system 150 (FIGS. 1-2). In the same or other embodiments, block 605 can be performed at least in part by application server 130 (FIGS. 1-2) and/or risk determination system 170 (FIGS. 1-2).

In a number of embodiments, method 600 further can include a block 606 of aggregating a set of risk signals including the first risk signals and the second risk signals. For example, risk determination system 170 (FIGS. 1-2) can collect the first risk signals from application server 130 (FIGS. 1-2) and can collect the second risk signals from authentication system 150 (FIGS. 1-2). The aggregated risk signals can be similar or identical to risk signals 311-316 (FIG. 3). In some embodiments, block 606 can be performed by risk determination system 170 (FIGS. 1-2). In the same or other embodiments, block 606 can be performed at least in part by application server 130 (FIGS. 1-2) and/or authentication system 150 (FIGS. 1-2).

In several embodiments, method 600 optionally can include a block 607 of storing a plurality of models each specific to a different activity. The models can be similar or identical to model 344 (FIG. 3), model 348 (FIG. 3), and/or the models described above in connection with block 216 (FIG. 2). In many embodiments, each of the plurality of models is non-probabilistic. In other embodiments, one or more of the plurality of model can be probabilistic at least in part. In some embodiments, each of the plurality of models can include a set of risk rules each comprising a weight. The risk rules can be similar or identical to algorithms 341-343 (FIG. 3) and/or 345-347 (FIG. 3). In various embodiments, each of the plurality of models can include a predefined outsort threshold score and a predefined decline threshold score that is different from the predefined outsort threshold score. In a number of embodiments, each of the plurality of models can be tunable to allow adjustment of the set of risk rules applicable to the model, the weights for the set of risk rules, the predefined outsort threshold score, and/or the predefined decline threshold score. In some embodiments, block 607 can be performed by risk determination system 170 (FIGS. 1-2). In the same or other embodiments, block 607 can be performed at least in part by application server 130 (FIGS. 1-2) and/or authentication system 150 (FIGS. 1-2).

In a number of embodiments, method 600 additionally can include, after block 606 or block 607, a block 608 of obtaining a first set of risk rules for a model specific to the activity requested by the user. The risk rules in the first set of risk rules can be similar or identical to algorithms 341-343 (FIG. 3) and/or 345-347 (FIG. 3). In several embodiments, each risk rule of the first set of risk rules can define weights when the risk rule is triggered based on one or more risk signals of the set of risk signals. In many embodiments, the plurality of models in block 607 can include the model specific to the activity requested by the user in block 608. In some embodiments, a first portion of the first set of risk rules can be stateless rules based on current data. In the same or other embodiments, a second portion of the first set of risk rules can be based at least in part on historical data. In some embodiments, block 608 can be performed by risk determination system 170 (FIGS. 1-2). In the same or other embodiments, block 608 can be performed at least in part by application server 130 (FIGS. 1-2) and/or authentication system 150 (FIGS. 1-2).

In several embodiments, method 600 further can include a block 609 of executing a risk engine using the first set of risk rules for the model and using the set of risk signals to generate a risk score. The risk engine can be similar or identical to risk engine 349 (FIG. 3). In many embodiments, the risk score can be based on the weights of triggered risk rules of the first set of risk rules. For example, the risk score can be a summation of the weights of the triggered risk rules, as described above. In a number of embodiments, the device data collector triggered in block 603 can execute system rules before the risk determination system executes the risk engine in block 609. In many embodiments, the system rules can be general rules that apply for all transactions run through an application server (e.g., 130 (FIGS. 1-2) and/or for all transactions involving accounts with certain financial institutions, such as financial institution 160 (FIG. 1). In some embodiments, block 609 can be performed by risk determination system 170 (FIGS. 1-2). In the same or other embodiments, block 609 can be performed at least in part by application server 130 (FIGS. 1-2) and/or authentication system 150 (FIGS. 1-2).

In a number of embodiments, method 600 additionally can include a block 610 of generating a disposition based on a comparison of the risk score to one or more predefined thresholds scores for the model. In many embodiments, the disposition can be approve, outsort, or decline. In several embodiments, the predefined threshold scores can be the predefined outsort threshold score and/or the predefined decline threshold score for the model. In some embodiments, block 610 can be performed by risk determination system 170 (FIGS. 1-2). In the same or other embodiments, block 610 can be performed at least in part by application server 130 (FIGS. 1-2) and/or authentication system 150 (FIGS. 1-2).

In several embodiments, method 600 further optionally can include a block 611 of performing, based on the disposition, an outsort activity to further authenticate the activity initiated by the user. As described above, the outsort activity can seek higher levels of proof to authenticate the attempted action. As an example of outsort activity, a challenge can be issued to the user, such as seeking bank credentials, sending a push alert seeking approval to a previously trusted device, sending an out-of-band message, such as through a fortified SMS text message exchange or email, validating and/or re-entering card data (e.g., PAN and CVV2). As another example of outsort activity, a fraud investigator can perform a further review of the transaction or attempted action, including the parties involved, the devices (e.g., the mobile device), etc. In some instances, for example, the fraud investigator can contact the user and/or the purported user through previously verified devices. In many embodiments, the disposition can be changed from outsort to accept or decline, based on the additional information obtained during the outsort activity. In some embodiments, block 611 can be performed by application server 130 (FIGS. 1-2). In the same or other embodiments, block 611 can be performed at least in part by authentication system 150 (FIGS. 1-2) and/or risk determination system 170 (FIGS. 1-2).

In a number of embodiments, method 600 further optionally can include, after block 610 or block 611, a block 612 of providing, based on the disposition, an approval of the activity initiated by the user. In some embodiments, block 612 can be performed by application server 130 (FIGS. 1-2). In the same or other embodiments, block 612 can be performed at least in part by authentication system 150 (FIGS. 1-2) and/or risk determination system 170 (FIGS. 1-2).

In several embodiments, method 600 further optionally can include, after block 610 or block 611, a block 613 of providing, based on the disposition, an rejection of the activity initiated by the user. In some embodiments, block 613 can be performed by application server 130 (FIGS. 1-2). In the same or other embodiments, block 613 can be performed at least in part by authentication system 150 (FIGS. 1-2) and/or risk determination system 170 (FIGS. 1-2).

Figure 7:
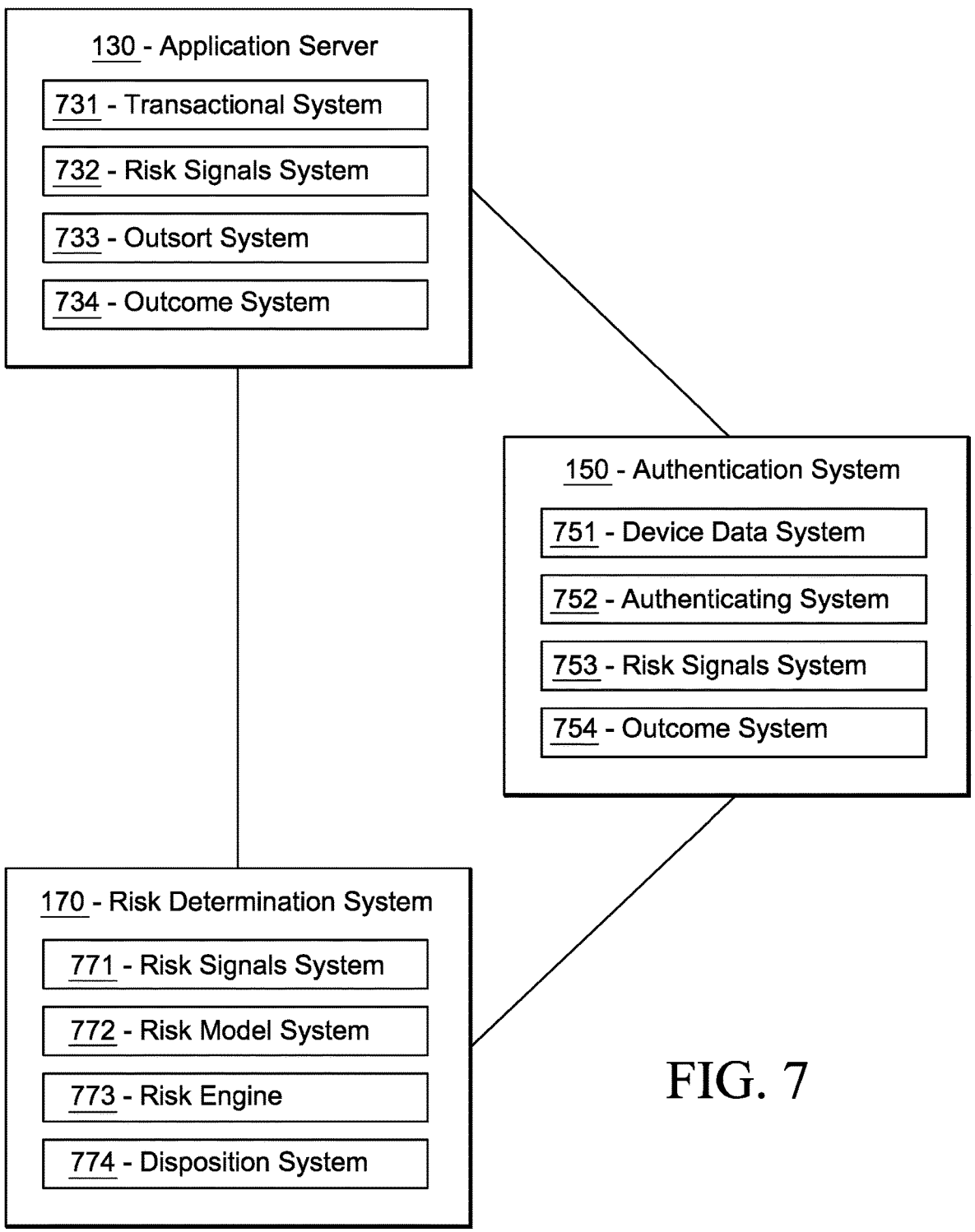
FIG. 7 illustrates a block diagram of system including the application server, authentication system, and risk determination system of FIG. 1.

Turning ahead in the drawings, FIG. 7 illustrates a block diagram of system 700 that can be employed for performing authentication and security for the mobile-device transactions. System 700 is merely exemplary, and embodiments of the system are not limited to the embodiments presented herein. The system can be employed in many different embodiments or examples not specifically depicted or described herein. In some embodiments, certain elements or modules of system 700 can perform various procedures, processes, and/or activities. In other embodiments, the procedures, processes, and/or activities can be performed by other suitable elements or modules of system 700. In many embodiments, system 700 can include application server 130, authentication system 150, and/or risk determination system 170.

Application server 130, authentication system 150, and/or risk determination system 170 are merely exemplary and are not limited to the embodiments presented herein. Application server 130, authentication system 150, and/or risk determination system 170 can be employed in many different embodiments or examples not specifically depicted or described herein. In some embodiments, certain elements or modules of system of application server 130, authentication system 150, and/or risk determination system 170 can perform various procedures, processes, and/or acts. In other embodiments, the procedures, processes, and/or acts can be performed by other suitable elements or systems. In many embodiments, the systems of application server 130, authentication system 150, and/or risk determination system 170 can be modules of computing instructions (e.g., software modules) stored at non-transitory computer readable media. In other embodiments, the systems of application server 130, authentication system 150, and/or risk determination system 170 can be implemented in hardware. In some embodiments, application server 130, authentication system 150, and/or risk determination system 170 each can be implemented on a separate computer system. In other embodiments, application server 130, authentication system 150, and risk determination system 170 can collectively be implemented on a single computer system.

In many embodiments, application server 130 can include a transactional system 731. In certain embodiments, transactional system 731 can at least partially perform block 601 (FIG. 6) of collecting transactional information from a mobile application on the mobile device.

In many embodiments, application server 130 can include a risk signals system 732. In certain embodiments, risk signals system 732 can at least partially perform block 602 (FIG. 6) of generating first risk signals based on the transactional information collected from the mobile application.

In many embodiments, application server 130 can include an outsort system 733. In certain embodiments, outsort system 733 can at least partially perform block 611 (FIG. 6) of performing, based on the disposition, an outsort activity to further authenticate the activity initiated by the user.

In many embodiments, application server 130 can include an outcome system 734. In certain embodiments, outcome system 734 can at least partially perform block 612 (FIG. 6) of providing, based on the disposition, an approval of the activity initiated by the user, and/or block 613 (FIG. 6) of providing, based on the disposition, an rejection of the activity initiated by the user.

In many embodiments, authentication system 150 can include a device data system 751. In certain embodiments, device data system 751 can at least partially perform block 603 (FIG. 6) of triggering a device data collector on the mobile device to collect device data on the mobile device.

In many embodiments, authentication system 150 can include an authenticating system 752. In certain embodiments, authenticating system 752 can at least partially perform block 604 (FIG. 6) of performing a multi-factor authentication.

In many embodiments, authentication system 150 can include a risk signals system 753. In certain embodiments, risk signals system 753 can at least partially perform block 605 (FIG. 6) of generating second risk signals based on the device data and results of performing the multi-factor authentication.

In many embodiments, authentication system 150 can include an outcome system 754. In certain embodiments, outcome system 754 can at least partially perform block 612 (FIG. 6) of providing, based on the disposition, an approval of the activity initiated by the user, and/or block 613 (FIG. 6) of providing, based on the disposition, an rejection of the activity initiated by the user.

In many embodiments, risk determination system 170 can include a risk signals system 771. In certain embodiments, risk signals system 771 can at least partially perform block 606 (FIG. 6) of aggregating a set of risk signals including the first risk signals and the second risk signals.

In many embodiments, risk determination system 170 can include a risk model system 772. In certain embodiments, risk model system 772 can at least partially perform block 607 (FIG. 6) of storing a plurality of models each specific to a different activity, and/or block 608 (FIG. 6) of obtaining a first set of risk rules for a model specific to the activity requested by the user.

In many embodiments, risk determination system 170 can include a risk engine 773. In certain embodiments, risk engine 773 can at least partially perform block 609 (FIG. 6) of executing a risk engine using the first set of risk rules for the model and using the set of risk signals to generate a risk score.

In many embodiments, risk determination system 170 can include a disposition system 774. In certain embodiments, disposition system 774 can at least partially perform block 610 (FIG. 6) of generating a disposition based on a comparison of the risk score to one or more predefined thresholds scores for the model.

In many embodiments, the techniques described herein can provide several technological improvements. Specifically, the techniques described herein can provide model that automatically performs authentication and security to limit the risk of fraud based on rules. These rules can be regularly fine-tuned to adjust based on emerging fraud threats. The risk of fraud is different from other risks, such as the risk of default on a loan, as fraudsters constantly change their approach to overcome current controls. Accordingly, the rules can change regularly, such as daily, to adjust to emerging threats. In many embodiments, the determination of the disposition can be performed in real-time after the user requests the activity that qualifies as a risk moment. The analysis of tens, hundred, or even thousands of rules for each activity in a real-time manner on a scale of many such activities (e.g., greater than 100, 1,000, 10,000, 100,000, 1,000,000, 10,000,000, or more per day) can be performed only using a computer.

Various embodiments include a system including an application server in data communication with a mobile application on a mobile device. The mobile device can be used by a user to initiate an activity at a risk moment. The application server can be configured to perform collecting transactional information from the mobile application on the mobile device. The application server also can be configured to perform generating first risk signals based on the transactional information collected from the mobile application. The system also can include an authentication system in data communication with the application server and the mobile device. The authentication system can be configured to perform triggering a device data collector on the mobile device to collect device data on the mobile device and send the device data to the authentication system. The authentication system also can be configured to perform a multi-factor authentication. The authentication system additionally can be configured to perform generating second risk signals based on the device data and results of performing the multi-factor authentication. The system additionally can include a risk determination system in data communication with the application server and the authentication system. The risk determination system can be configured to perform aggregating a set of risk signals comprising the first risk signals and the second risk signals. The risk determination system also can be configured to perform obtaining a first set of risk rules for a model specific to the activity requested by the user. Each risk rule of the first set of risk rules can define weights when the risk rule is triggered based on one or more risk signals of the set of risk signals. The risk determination system additionally can be configured to perform executing a risk engine using the first set of risk rules for the model and using the set of risk signals to generate a risk score. The risk score can be based on the weights of triggered risk rules of the first set of risk rules. The risk determination system further can be configured to perform generating a disposition based on a comparison of the risk score to one or more predefined thresholds scores for the model.

A number of embodiments include a method being implemented via execution of computing instructions configured to run at one or more processors and stored at one or more non-transitory computer-readable media. The method can include collecting transactional information from a mobile application on the mobile device. The mobile device can be used by a user to initiate an activity at a risk moment. The method also can include generating first risk signals based on the transactional information collected from the mobile application. The method additionally can include triggering a device data collector on the mobile device to collect device data on the mobile device. The method further can include performing a multi-factor authentication. The method can additionally include generating second risk signals based on the device data and results of performing the multi-factor authentication. The method further can include aggregating a set of risk signals comprising the first risk signals and the second risk signals. The method additionally can include obtaining a first set of risk rules for a model specific to the activity requested by the user. Each risk rule of the first set of risk rules can define weights when the risk rule is triggered based on one or more risk signals of the set of risk signals. The method further can include executing a risk engine using the first set of risk rules for the model and using the set of risk signals to generate a risk score. The risk score can be based on the weights of triggered risk rules of the first set of risk rules. The method additionally can include generating a disposition based on a comparison of the risk score to one or more predefined thresholds scores for the model.

Although embodiments of providing authentication and security for mobile-device transactions has been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-7 may be modified, and that the foregoing discussion of certain of these embodiments does not necessarily represent a complete description of all possible embodiments. For example, one or more of the procedures, processes, or activities of FIGS. 2-3 and 6 may include different procedures, processes, and/or activities and be performed by many different modules, in many different orders, and/or one or more of the procedures, processes, or activities of FIGS. 2-3 and 6 may include one or more of the procedures, processes, or activities of another different one of FIGS. 2-3 and 6. As another example, the systems within application server 130, authentication system 150, and risk determination system 170 (FIGS. 1-2, 7) can be interchanged or otherwise modified.

Replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system, for determining a disposition of a request of an activity initiated by a mobile device of a user at a risk moment, wherein the mobile device comprises a mobile payment application and a device data collector, the system comprising:
   an application server;
   an authentication system; and
   a risk determination system;
   wherein the application server in data communication with the mobile application on the mobile device, the application server comprising an application server processor and an application server memory storing application server instructions that, when executed by the application server processor, cause the application server processor to perform:
      receiving transactional information from the mobile payment application on the mobile device, wherein the transaction information comprises information of the request from the mobile device at the risk moment;
      generating first risk data based on the transactional information from the mobile payment application;
      sending the received transaction information to the authentication system;
   wherein the authentication system in data communication with the application server and the mobile device, the authentication system comprising an authentication system processor and an authentication system memory storing authentication system instructions that, when executed by the authentication system processor, cause the authentication system processor to perform:
      activating the device data collector on the mobile device, wherein the activating the device data collector further comprises receiving device data from the device data collector of the mobile device;
      authenticating the user, wherein the authenticating comprises a multi-factor authentication of the user via the mobile device;
      generating second risk data based on the device data from the mobile device and the multi-factor authentication;
   wherein the risk determination system in data communication with the application server and the authentication system, the risk determination system comprising a risk determination system processor and a risk determination system memory storing a risk engine and risk determination system instructions that, when executed by the risk determination system processor, cause the risk determination system processor to perform:
      receiving the first risk data from the application server and the second risk data from the authentication system;
      aggregating a set of risk data based on the first risk data and the second risk data;
      obtaining a first set of risk rules associated with a model of the activity based on the aggregated set of risk data, wherein each risk rule of the first set of risk rules is associated with weights;
      generating a risk score by executing a risk engine using the obtained first set of risk rules and the aggregated set of risk data, wherein the generating the risk score further comprises summing the weights associated with the obtained first set of risk rules;
      comparing the generated risk score to one or more threshold scores of the model;
      generating the disposition based on the comparison;
      sending the disposition to the application server;
   wherein the application server memory stores additional application server instructions, that when executed by the application server processor, further cause the application server processor to perform:
      receiving the disposition from the risk determination system; and
      providing an approval or a rejection of the activity based on the disposition.

2. The system of claim 1, wherein: the application server memory stores additional application server instructions, when executed by the application server processor, further cause the application server processor to perform:
   performing, based on the received disposition, an outsort activity prior to providing the approval of the activity.

3. The system of claim 1, wherein the application server memory stores additional application server instructions, when executed by the application server processor, further cause the application server processor to perform:
   performing, based on the received disposition, an outsort activity prior to providing the rejection of the activity.

4. The system of claim 1, wherein the risk determination system memory stores additional the risk determination system instructions, when executed by the risk determination system processor, further cause the risk determination system processor to perform:
   storing a plurality of models, wherein each of the plurality of models is associated with a different activity wherein the plurality of models comprise the model associated with the activity requested by the user.

5. The system of claim 4, wherein:
   each of the plurality of models is non-probabilistic.

6. The system of claim 4, wherein:
   each of the plurality of models comprises a set of risk rules each comprising a weight; and
   each of the plurality of models comprises a predefined outsort threshold score and a predefined decline threshold score that is different from the predefined outsort threshold score.

7. The system of claim 6, wherein:
   each of the plurality of models is tunable to allow adjustment of the set of risk rules applicable to the model, the weights for the set of risk rules, the predefined outsort threshold score, and the predefined decline threshold score.

8. The system of claim 1, wherein:
   a first portion of the first set of risk rules are stateless rules based on current data; and
   a second portion of the first set of risk rules are based at least in part on historical data.

9. The system of claim 1, wherein, before the risk determination system executes the risk engine, the activating the device data collector on the mobile device further comprises activating the device data collector on the mobile device to run system-level checks via system rules.

10. The system of claim 1, wherein:
the multi-factor authentication is based at least in part on: (a) the device data, and (b) information obtained from one or more calls to at least one of: (i) a mobile network operator for the mobile device, or (ii) a card network that handles transactions for a card that is associated with the activity.

11. A method, for determining a disposition of a request of an activity initiated by a mobile device of a user at a risk moment, wherein the mobile device comprises a mobile payment application and a device data collector, the method comprising:
receiving, by an application server, transactional information from the mobile payment application on the mobile device, wherein the transaction information comprises information of the request from the mobile device at the risk moment;
generating, by the application server, first risk data based on the transactional information from the mobile payment application;
sending, by the application server, the received transaction information to an authentication system;
activating, by the authentication system, the device data collector on the mobile device, wherein the activating the device data collector further comprises receiving device data from the device data collector of the mobile device;
authenticating, by the authentication system, the user, wherein the authenticating comprises a multi-factor authentication of the user via the mobile device;
generating, by the authentication system, second risk data based on the device data from the mobile device and the multi-factor authentication;
receiving, by a risk determination system, the first risk data from the application server and the second risk data from the authentication system;
aggregating, by the risk determination system, a set of risk data based on the first risk data and the second risk data;
obtaining, by the risk determination system, a first set of risk rules associated with a model of the activity based on the aggregated set of risk data, wherein each risk rule of the first set of risk rules is associated with weight;
generating, by the risk determination system, a risk score by executing a risk engine using the obtained first set of risk rules and the aggregated set of risk data, wherein the generating the risk score further comprises summing the weights associated with the obtained first set of risk rules;
comparing, by the risk determination system, the generated risk score to one or more threshold scores of the model;
generating, by the risk determination system, the disposition based on the comparison;
sending, by the risk determination system, the disposition to the application server;
receiving, by the application server, the disposition from the risk determination system; and
providing, by the application server, an approval or a rejection of the activity based on the disposition.

12. The method of claim 11, wherein the receiving the disposition from the risk determination system further comprises performing, by the application server, based on the received disposition, an outsort activity prior to providing the approval of the activity.

13. The method of claim 11, wherein the receiving the disposition from the risk determination system further comprises performing, by the application server, based on the received disposition, an outsort activity prior to providing the rejection of the activity.

14. The method of claim 11 further comprising:
storing, by the risk determination system, a plurality of models, wherein each of the plurality of models is associated with a different activity, wherein the plurality of models comprise the model associated with the activity requested by the user.

15. The method of claim 14, wherein:
each of the plurality of models is non-probabilistic.

16. The method of claim 14, wherein:
each of the plurality of models comprises a set of risk rules each comprising a weight; and
each of the plurality of models comprises a predefined outsort threshold score and a predefined decline threshold score that is different from the predefined outsort threshold score.

17. The method of claim 16, wherein:
each of the plurality of models is tunable to allow adjustment of the set of risk rules applicable to the model, the weights for the set of risk rules, the predefined outsort threshold score, and the predefined decline threshold score.

18. The method of claim 11, wherein:
a first portion of the first set of risk rules are stateless rules based on current data; and
a second portion of the first set of risk rules are based at least in part on historical data.

19. The method of claim 11, wherein, before the risk determination system executes the risk engine, the activating the device data collector on the mobile device further comprises activating, by the authentication system, the device data collector on the mobile device to run system-level checks via system rules.

20. The method of claim 11, wherein:
the multi-factor authentication is based at least in part on: (a) the device data, and (b) information obtained from one or more calls to at least one of: (i) a mobile network operator for the mobile device, or (ii) a card network that handles transactions for a card that is associated with the activity.

* * * * *